United States Patent
Evsyukov et al.

(10) Patent No.: US 9,828,468 B2
(45) Date of Patent: Nov. 28, 2017

(54) CURABLE MIXTURES BASED ON XYLYLENE BISMALEIMIDE

(71) Applicants: Sergey Evsyukov, Ludwigshafen (DE); Tim Pohlmann, Nidderau (DE); Horst Stenzenberger, Heidelberg (DE)

(72) Inventors: Sergey Evsyukov, Ludwigshafen (DE); Tim Pohlmann, Nidderau (DE); Horst Stenzenberger, Heidelberg (DE)

(73) Assignee: EVONIK DEGUSSA GMBH, Essen (DE)

( * ) Notice: Subject to any disclaimer, the term of this patent is extended or adjusted under 35 U.S.C. 154(b) by 0 days.

(21) Appl. No.: 14/779,189

(22) PCT Filed: Mar. 12, 2014

(86) PCT No.: PCT/EP2014/054824
§ 371 (c)(1),
(2) Date: Sep. 22, 2015

(87) PCT Pub. No.: WO2014/154485
PCT Pub. Date: Oct. 2, 2014

(65) Prior Publication Data
US 2016/0053054 A1   Feb. 25, 2016
US 2016/0264735 A2   Sep. 15, 2016

(30) Foreign Application Priority Data

Mar. 28, 2013  (EP) ..................... 13161579

(51) Int. Cl.
| | | |
|---|---|---|
| *C08F 2/00* | (2006.01) | |
| *C08F 26/02* | (2006.01) | |
| *C08F 126/06* | (2006.01) | |
| *C08F 226/06* | (2006.01) | |
| *C08F 22/40* | (2006.01) | |
| *C08F 26/06* | (2006.01) | |
| *C08F 122/40* | (2006.01) | |
| *C08F 222/40* | (2006.01) | |
| *C08F 2/08* | (2006.01) | |
| *C08G 73/10* | (2006.01) | |
| *C08G 73/12* | (2006.01) | |
| *C08L 79/08* | (2006.01) | |

(52) U.S. Cl.
CPC ............ *C08G 73/10* (2013.01); *C08F 222/40* (2013.01); *C08G 73/12* (2013.01); *C08L 79/08* (2013.01); *C08L 79/085* (2013.01)

(58) Field of Classification Search
None
See application file for complete search history.

(56) References Cited

U.S. PATENT DOCUMENTS

| | | |
|---|---|---|
| 3,127,414 A | 3/1964 | Cole et al. |
| 3,839,358 A | 10/1974 | Bargain |
| 4,100,140 A | 7/1978 | Zahir et al. |
| 4,229,351 A | 10/1980 | Kiefer |
| 4,351,932 A | 9/1982 | Street et al. |
| 4,632,966 A | 12/1986 | Kanagawa et al. |
| 4,789,704 A | 12/1988 | Stenzenberger et al. |
| 4,853,449 A | 8/1989 | Domeier |
| 4,855,450 A | 8/1989 | Butler et al. |
| 4,981,934 A | 1/1991 | Stenzenberger et al. |
| 5,747,615 A | 5/1998 | Repecka |
| 2008/0075965 A1 | 3/2008 | Dershem |
| 2009/0215961 A1* | 8/2009 | Bongiovanni ....... C08G 73/121 525/132 |
| 2012/0049106 A1 | 3/2012 | Dershem |

FOREIGN PATENT DOCUMENTS

EP          0469684 A1      2/1992

* cited by examiner

*Primary Examiner* — Robert T Butcher
(74) *Attorney, Agent, or Firm* — Reed Smith LLP; Matthew P. Frederick; Ryan P. Cox

(57) ABSTRACT

The invention relates to a curable mixture comprising: RM % of m-xylylene bismaleimide of formula (I)

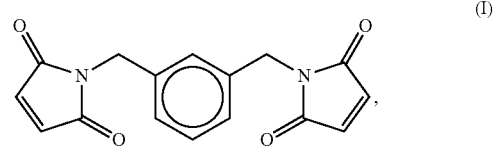

(I)

RP % of a polyimide component, and RC % of a comonomer component. Further, the invention relates to methods for the preparation of the curable mixture, methods for the preparation of a prepolymer, of a crosslinked polymer, and composite materials, in particular of fiber-reinforced composites. In addition, the present invention relates to a prepolymer, a crosslinked polymer and composite materials, in particular fiber-reinforced composites, obtainable by said methods.

23 Claims, No Drawings

CURABLE MIXTURES BASED ON XYLYLENE BISMALEIMIDE

This application is the United States national stage of International Application No. PCT/EP2014/054824, filed Mar. 12, 2014,which claims benefit of European Patent Application No. 13161579.1, filed Mar. 28, 2013,both of which are herein incorporated by reference in their entirety.

FIELD OF THE INVENTION

The present invention relates to curable thermosetting polyimide resin compositions based on m-xylylene bismaleimide, polyimide, and co-monomers. The present invention also relates to crosslinked resins obtainable by curing such compositions. The new thermosetting resin systems find uses as structural adhesives, as matrix resins for prepregs and moulding compounds, and as structural and/or electrical composites. The new resin compositions are in particular suitable for the manufacture of advanced composites by wet processing techniques such as filament winding, resin transfer moulding (RTM), resin infusion moulding (RIM), and prepregging.

BACKGROUND OF THE INVENTION

Polyimides, e.g. bismaleimide functional compounds, are useful monomers that have found wide applications in composite resins, adhesives, and moulding compounds. Such polyimides are known to be capable of polymerizing to yield polymerization- and polyaddition products possessing high glass transition temperature, high modulus, and good heat resistance properties.

However, it is commonly known that members of an important class of bismaleimides, i.e. aromatic mononuclear or aromatic polynuclear N,N'-bismaleimides possess poor handling properties, since they have high melting points and only poor solubility in common solvents. Due to these properties the application of curable mixtures containing such N,N'-bismaleimides is often associated with processing difficulties. In addition, in the past it has been found that cured products based on curable mixtures comprising such N,N'-bismaleimides are brittle, and show high moisture absorption, which results in poor hot/wet performance. Accordingly, many of the conventional curable mixtures based on such N,N'-bismaleimides are severely limited in their applications.

U.S. Pat. No. 4,351,932, for example, describes mixtures comprising N,N'-bismaleimides or mixtures of N,N'-bismaleimides and divinylbenzene as comonomer for the application as prepreg resins. These resins have only poor processing properties because of their short pot life and short gel time. Prepregs made therefrom have a short out time and poor tack and drape. Furthermore, the cured products are brittle and show high water uptake.

EP 0 469 684 A1 discloses mixtures comprising N,N'-bismaleimides or mixtures of N,N'-bismaleimides and alkenylphenoxyalkanes as comonomers. Although these curable mixtures possess relatively low viscosity in the molten state, they suffer from crystallization instability, which makes them almost unusable for the manufacture of fibre-reinforced composites via hot melt techniques, such as filament winding and resin transfer moulding. In addition, their solubility in common solvents is poor, which limits their applicability for solvent/solution prepregging.

US 2008/0075965 A1 discloses adhesive formulations comprising only one maleimide and an aromatic diene, or an aromatic monoene. The favoured compositions of this application are based on 1,3-diisopropenylbenzene and oligomers thereof, or on compounds that carry isopropenyl functional groups combined with limonene-bismaleimide as the favoured maleimide. Such compositions are extremely fast-curing and are, therefore, unsuitable for the manufacture of fibre-reinforced composites via filament winding, resin transfer moulding and the like. The mixtures suffer from viscosity instability due to rapid resin advancement.

US 2012/0049106 A1 discloses amorphous low-melting bismaleimide mixtures, which are synthesized by employing a mixture of maleic anhydride and alkenyl-substituted succinic anhydride. However, these mixtures, when cured in the presence of co-monomers, provide cured products that suffer from low glass transition temperature and reduced long-term thermal stability due to the long aliphatic side chains of the succinic anhydride precursor.

Therefore, there is a need for curable mixtures based on polyimides, which are tough and heat-resistant after cure, and which provide improved processing properties as hot melts and/or as solutions to fiber-reinforced composites.

As many of the processing difficulties of curable mixtures containing aromatic mono-nuclear or aromatic polynuclear N,N'-bismaleimides as well as many of the limitations for their application are associated with high melting points and poor solubility in common solvents of the bismaleimides employed, attempts have been undertaken in the prior art to find bismaleimides or mixtures thereof that avoid these drawbacks. EP 0469684A1, for example, discloses that eutectic mixtures of bismaleimides can be used in order to lower the melting point. In particular, EP 0469684A1 (examples 5-11), discloses that the eutectic mixture of 4,4'-bismaleimidodiphenylmethane and 2,4-bismaleimidotoluene may be employed in combination with bis(alkenylphenoxy)alkane as a comonomer, alone or in combination with other comonomers, for tough cured products. However, as indicated above, although these curable mixtures possess relatively low viscosity in the molten state, they suffer from crystallization instability, which makes them almost unusable for the manufacture of fibre-reinforced composites via hot melt techniques, such as filament winding and resin transfer moulding. In addition, their solubility in common solvents is poor, which limits their applicability for solvent/solution prepregging.

It is, therefore, an object of the present invention to provide curable mixtures that are low melting, possess low viscosity at the lowest possible temperature, that are, further, stable at the processing temperature in terms of no or only slight (low viscosity) advancement during processing, at least for a time sufficient to manufacture a part, and which are, in addition, stable in terms of no crystallization of resin components throughout the manufacturing process.

It is a further object of the present invention to provide curable mixtures and curable prepolymers, which are processable to fibre-reinforced composites with the use of techniques, requiring stable, low-viscosity melt resins, such as filament winding (FW), hot melt prepregging, resin transfer moulding (RTM), and resin infusion moulding (RIM).

It is a further object of the present invention to provide low-melting and low-viscosity prepolymers, which are stable with respect to crystallization and resin advancement in the molten state.

It is a further object of the present invention to provide curable mixtures and curable prepolymers, which are soluble in low-boiling solvents comprising 1,3-dioxolane, and which form stable solutions with respect to resin crystallization and advancement.

The problem underlying the present invention, thus, resides in providing curable mixtures exhibiting above-mentioned desired characteristics. It has been found that this problem is solved by the curable mixtures defined below.

SUMMARY OF THE INVENTION

The present invention, in one aspect, relates to a curable mixture comprising:
RM % of m-xylylene bismaleimide of formula (I)

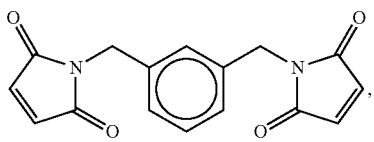

(I)

RP % of a polyimide component, and
RC % of a comonomer component,
wherein
the polyimide component consists of at least one polyimide of formula (II)

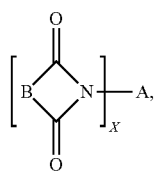

(II)

wherein
A is an X-functional group with at least two carbon atoms,
X is an integer ≥2, and
B is a difunctional group comprising a carbon-carbon double bond;
with the proviso that when B is

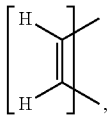

A cannot be

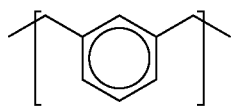

and X cannot be 2;
wherein the comonomer component consists of at least one comonomer selected from: alkenylphenol, alkenylphenol ether, phenol alkenyl ether, alkenylphenoxy benzophenone, polyamine, aminophenol, amino acid hydrazide, cyanate ester, diallyl phthalate, triallyl isocyanurate, triallyl cyanurate, styrene, and divinylbenzene;
and wherein
RM % is defined as 1 wt % to 98 wt %;
RP % is defined as 1 wt % to 98 wt %;
RC % is defined as 1 wt % to 98 wt %;
and wherein the sum of RM %, RP % and RC % is less than or equal to 100 wt %.

In one embodiment, the polyimide component consists of at least one polyimide of formula (II), wherein A is selected from the following difunctional groups:
a) alkylene with 2 to 12 carbon atoms;
b) a mono- or dicarbocyclic aliphatic group;
c) a bridged multicyclic aliphatic group;
d) a heterocyclic aliphatic group;
e) a mono- or dicarbocyclic aromatic group;
f) a bridged multicyclic aromatic group;
g) a heterocyclic aromatic group;
(h) one of the following groups:

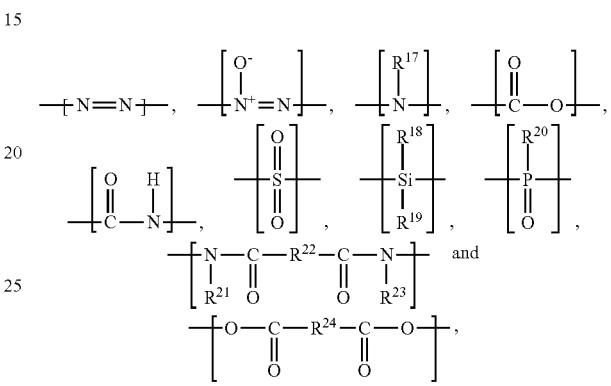

wherein $R^{17}$, $R^{18}$, $R^{19}$, $R^{20}$, $R^{21}$ and $R^{23}$ are identical or different and each is independently from the other alkyl with 1 to 6 carbon atoms,
and wherein $R^{22}$ and $R^{24}$ are identical or different and each is independently from the other alkylene with 1 to 6 carbon atoms;
(i) a group defined by formula (IX)

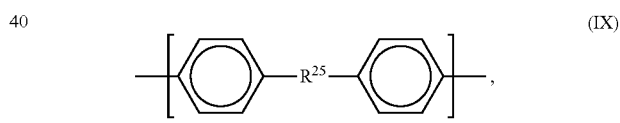

(IX)

wherein $R^{25}$ is selected from the following groups:

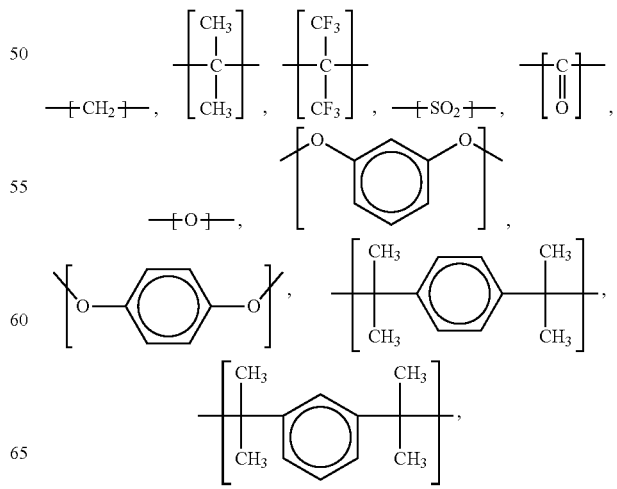

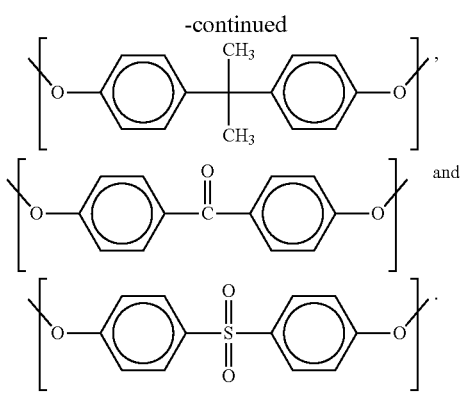

In one embodiment, B in formula (II) is selected from the following groups:

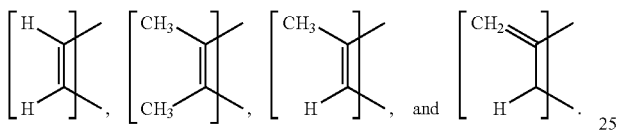

In a preferred embodiment, the polyimide component consists of at least one polyimide selected from 4,4'-bismaleimidodiphenylmethane, bis(3-methyl-5-ethyl-4-maleimidophenyl)methane, bis(3,5-dimethyl-4-maleimidophenyl)methane, 4,4'-bismaleimidodiphenyl ether, 4,4'-bismaleimidodiphenylsulfone, 3,3'-bismaleimidodiphenylsulfone, bismaleimidodiphenylindane, 2,4-bismaleimidotoluene, 2,6-bismaleimidotoluene, 1,3-bismaleimidobenzene, 1,2-bismaleimidobenzene, 1,4-bismaleimidobenzene, 1,2-bismaleimidoethane, 1,6-bismaleimidohexane, 1,6-bismaleimido-(2,2,4-trimethyl)hexane, 1,6-bismaleimido-(2,4,4-trimethyl)hexane, 1,4-bismaleimidocyclohexane, 1,3-bis(maleimidomethyl)cyclohexane, 1,4-bis(maleimidomethyl)cyclohexane, and 4,4'-bismaleimidodicyclohexylmethane.

In one embodiment, the comonomer component consists of at least one comonomer selected from:
(a) a compound of formula (III)

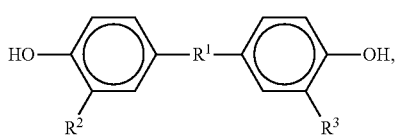

wherein
$R^1$ is a difunctional group, and
$R^2$ and $R^3$ are identical or different and each is independently from the other alkenyl with 2 to 6 carbon atoms;
(b) a compound of formula (IV)

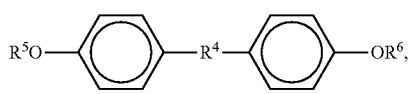

wherein
$R^4$ is a difunctional group, and
$R^5$ and $R^6$ are identical or different and each is independently from the other alkenyl with 2 to 6 carbon atoms;
(c) a compound of formula (V)

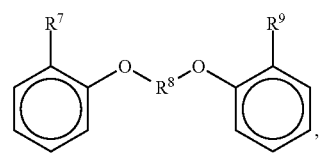

wherein
$R^8$ is a difunctional group, and
$R^7$ and $R^9$ are identical or different and each is independently from the other alkenyl with 2 to 6 carbon atoms;
(d) a compound of formula (VI)

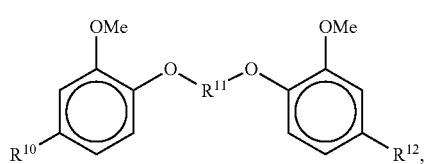

wherein
$R^{11}$ is a difunctional group, and
$R^{10}$ and $R^{12}$ are identical or different and each is independently from the other alkenyl with 2 to 6 carbon atoms;
(e) a compound of formula (VII)

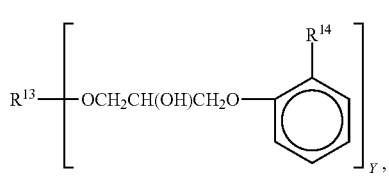

wherein
$R^{13}$ is a Y-functional group,
$R^{14}$ is alkenyl with 2 to 6 carbon atoms, and
Y is an integer $\geq 1$; and
(f) a compound of formula (VIII)

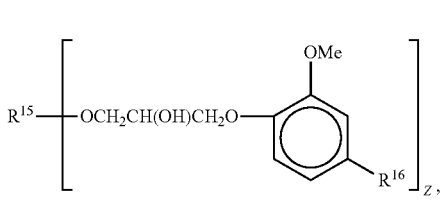

wherein
$R^{15}$ is a Z-functional group,
$R^{16}$ is alkenyl with 2 to 6 carbon atoms, and
Z is an integer $\geq 1$.
In one embodiment, $R^1$ and $R^4$ are selected from the following groups:

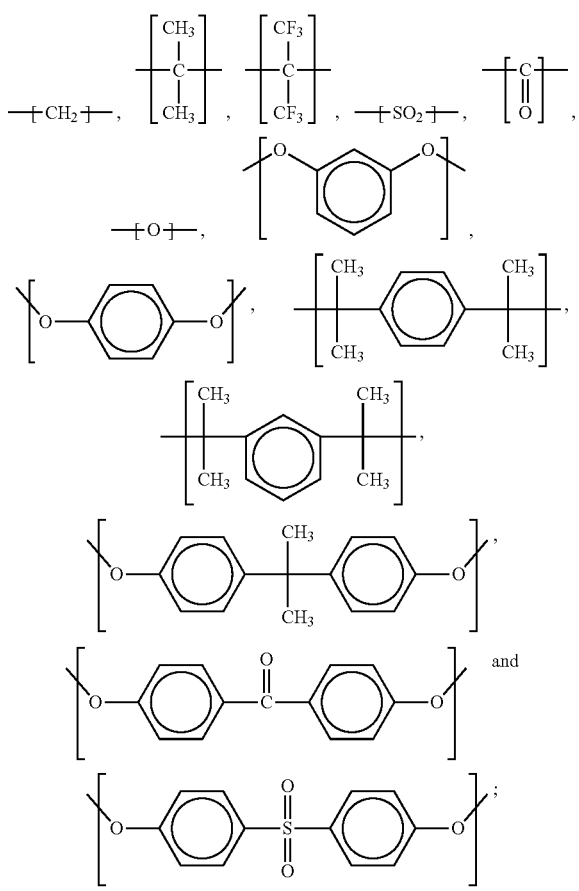

and

R², R³, R⁵ and R⁶ are preferably identical and are 1-propenyl or 2-propenyl;

wherein R⁸ and R¹¹ are preferably selected from the following groups:

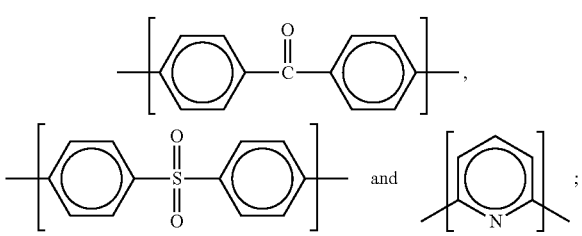

and

R⁷, R⁹, R¹⁰ and R¹² are identical and are 1-propenyl or 2-propenyl;

wherein R¹³ and R¹⁵ are difunctional aromatic groups selected from the following groups:

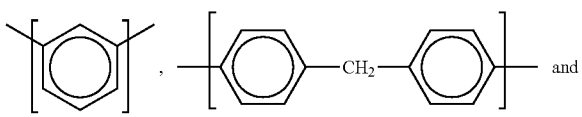

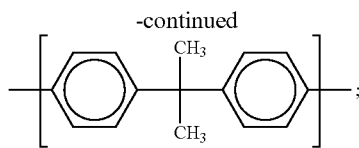

and wherein $R^{14}$ and $R^{16}$ are 1-propenyl or 2-propenyl.

In a preferred embodiment, the comonomer component consists of at least one comonomer selected from: 3,3'-diallylbisphenol A, diallyl ether of bisphenol A, bis-(o-propenylphenoxy)benzophenone, m-aminobenzhydrazide, bisphenol A dicyanate ester, diallyl phthalate, triallyl isocyanurate, triallyl cyanurate, styrene, and divinylbenzene.

Particularly preferred, the comonomer component consists of at least one comonomer selected from: 3,3'-diallylbisphenol A, diallyl ether of bisphenol A, bis-(o-propenylphenoxy)benzophenone, m-aminobenzhydrazide, and bisphenol A dicyanate ester.

In a preferred embodiment, RM % is defined as 5 wt % to 70 wt %; RP % is defined as 1 wt % to 60 wt %; and RC % is defined as 20 wt % to 80 wt %.

In one embodiment, the curable mixture of the invention further comprises a cure accelerator or a cure inhibitor.

In one aspect, the invention relates to a method for the preparation of a curable mixture as defined above, comprising the step of:

blending m-xylylene bismaleimide of formula (I) as defined above, a polyimide component as defined above and a comonomer component as defined above, at a temperature ranging from 60° C. to 180° C. to obtain a curable mixture as a low melting, low viscosity mass (resin).

In one aspect, the invention relates to a method for the preparation of a curable mixture as defined above, comprising the steps of:

dissolving m-xylylene bismaleimide (I) as defined above, a polyimide component as defined above, and a comonomer component as defined above in a solvent, and stripping off the solvent to obtain a curable mixture as a solvent-free, low melting, low viscosity mass (resin).

In one embodiment, the solvent is 1,3-dioxolane or a 1,3-dioxolane-containing solvent.

In one aspect, the invention relates to a method for the preparation of a curable prepolymer comprising the step of: keeping a curable mixture as defined above to a temperature ranging from 25° C. to 280° C. for a time sufficient to obtain a prepolymer, which is still formable upon the application of heat and/or pressure.

In one aspect, the invention relates to a curable prepolymer obtainable according to the method as defined above.

In one aspect, the invention relates to a method for the preparation of a crosslinked polymer comprising the step of: heating a curable mixture as defined above or a curable prepolymer as defined above to a temperature ranging from 70° C. to 280° C. for a time sufficient to complete cure.

In one aspect, the invention relates to a crosslinked polymer obtainable by the method as defined above.

In one aspect, the invention relates to a method for the preparation of a composite material comprising the steps of: applying or blending a curable mixture in form of a low-viscosity-melt stable resin obtainable according to the method as defined above, or a prepolymer as defined above, onto or with a fibrous or particulate reinforcement (filler); and subsequent curing.

In one aspect, the invention relates to a composite material obtainable according to the method as defined above.

In one embodiment, the composite material is a fiber-reinforced or a particulate-filled composite.

In one aspect, the invention relates to the use of a curable mixture as defined above for the preparation of a prepolymer or a crosslinked polymer.

Definitions

As used herein, including the accompanying claims, the terms, which are collectively used, have the following meanings.

As used herein, the term "curable" means that an original compound(s) or mixture material(s) can be transformed into a solid, substantially non-flowing material by means of chemical reaction, crosslinking, radiation crosslinking or the like.

As used herein, the term "mixture" means a physical or mechanical aggregation or a combination of three or more individual, chemically distinct compounds that are not chemically united.

As used herein, the term "polyimide component" means one polyimide or a mixture of two or more polyimides, preferably one polyimide or a mixture of two to four polyimides.

As used herein, the term "comonomer" means a compound that can undergo polymerization or copolymerization, thereby contributing constitutional units to the essential structure of a polymer.

As used herein, the term "comonomer component" means one comonomer or a mixture of two or more comonomers, preferably one comonomer or a mixture of two to four comonomers.

As used herein, the term "RM %" indicates the amount in wt %, in which m-xylene bismaleimide of formula (I) is present in the curable mixture.

As used herein, the term "RP %" indicates the amount in wt %, in which the polyimide component is present in the curable mixture.

As used herein, the term "RC %" indicates the amount in wt %, in which the comonomer component is present in the curable mixture.

As used herein, the term "alkenylphenol" means organic compounds comprising at least one alkenyl-substituted phenol group. The term "alkenylphenol" comprises alkenylphenols, wherein two phenol groups are bridged via a difunctional group, e.g. alkenylbisphenols. Examples include 3,3'-diallyl-bisphenol A.

As used herein, the term "alkenylphenyl ether" means organic compounds comprising at least one alkenyloxyphenyl group, i.e. an ether group wherein the ether oxygen atom is connected on one hand to an alkenyl residue and on the other hand to a phenyl residue. The term "alkenylphenyl ether" comprises alkenylphenyl ethers, wherein two phenyl groups are bridged by a difunctional group, e.g. alkenylbisphenol ether. Examples include diallyl ether of bisphenol A.

As used herein, the term "alkenylphenol ether" means organic compounds comprising at least one alkenylphenoxy group, e.g. an ether group wherein the ether oxygen atom is connected on one hand to an alkenylphenyl group and on the other hand to a an alkyl or an aryl group. The term "alkenylphenol ether" comprises organic compounds, wherein two alkenylphenoxy groups are bridged by a difunctional group, e.g. by an aromatic group such as a benzophenone group. Examples include bis-(o-propenylphenoxy)benzophenone.

As used herein, the term "polyamine" means an organic compound having two or more primary amino groups —$NH_2$. Examples include, but are not limited to 4,4'-diaminodiphenylmethane, 4,4'-diaminodiphenylsulfone, 3,3'-diaminodiphenylsulfone, diaminodiphenylindane, m-phenylenediamine, p-phenylenediamine, 2,4-diaminotoluene, 2,6-diaminotoluene, m-xylylenediamine and aliphatic diamines such as ethylenediamine, hexamethylenediamine, trimethylhexamethylenediamine, and 1,12-diaminododecane.

As used herein, the term "aminophenol" means amino-substituted phenols. Examples include m-aminophenol and p-aminophenol.

As used herein, the term "amino acid hydrazides" means any hydrazides of amino acids. Examples include m-aminobenzhydrazide and p-aminobenzhydrazide.

As used herein, the term "cyanate ester" means a bisphenol or polyphenol, e.g. novolac, derivative, in which the hydrogen atom of the phenolic OH group is substituted by a cyano-group, resulting in an-OCN group. Examples include bisphenol A dicyanate ester, commercially available as, e.g. Primaset BADCy from Lonza or AroCy B-10 from Huntsman, as well as other Primaset or AroCy types, e.g. bis(3,5-dimethyl-4-cyanatophenyl)methane (AroCy M-10), 1,1-bis(4-cyanatophenyl)ethane (AroCy L-10), 2,2-bis(4-cyanatophenyl)-1,1,1,3,3,3-hexafluoropropane (AroCy F-10), 1,3-bis(1-(4-cyanatophenyl)-1-methylethylidene) benzene (AroCy XU-366), di(4-cyanatophenyl)thioether (AroCy RDX-80371; AroCy T-10), bis(4-cyanatophenyl) dichloromethylidenemethane (AroCy RD98-228), bis(4-cyanatophenyl)octahydro-4,7-methanoindene (AroCy XU-71787.02L), as well as bis(4-cyanatophenyl)methane, bis(3-methyl-4-cyanatophenyl)methane, bis(3-ethyl-4-cyanatophenyl)methane, di(4-cyanatophenyl)ether, 4,4-dicyanatobiphenyl, 1,4-bis(1-(4-cyanatophenyl)-1-methylethylidene)benzene, and resorcinol dicyanate. A preferred example is bisphenol A dicyanate ester.

Any bond intersected by a bracket indicates a bond that connects the moiety within the bracket to other moieties of the same compound. For example, in the group shown below the two bonds of the ethenyl group intersected by the bracket on the right side connect this moiety to other moieties of the compound containing this ethenyl group.

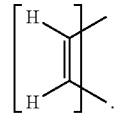

As used herein, the term "halogen" means a fluorine, chlorine, bromine or iodine atom, preferably a fluorine or chlorine atom, more preferably a fluorine atom.

As used herein, "alkyl" means a straight-chain or branched alkyl group. The term "alkyl with n to m carbon atoms" means an alkyl group with n to m carbon atoms. If not denoted otherwise, "alkyl" means an alkyl with 1 to 6 carbon atoms. In the context of the present invention, preferred alkyl groups are straight-chain or branched alkyl groups with 1 to 4 carbon atoms. Examples of straight-chain and branched alkyl groups include, but are not limited to methyl, ethyl, propyl, isopropyl, butyl, isobutyl, tert.-butyl, the isomeric pentyls, the isomeric hexyls, preferably methyl and ethyl and most preferred methyl.

As used herein, "alkylene" means a difunctional alkyl group. The term "alkylene with n to m carbon atoms" means an alkylene group with n to m carbon atoms. If not denoted otherwise, "alkylene" means an alkylene with 1 to 12 carbon atoms. In the context of the present invention, preferred alkylene groups are alkylene groups with 1 to 9 carbon atoms, more preferably from 1 to 6 carbon atoms. Examples include, but are not limited to methylene, ethylene, propylene, butylene, hexamethylene and 2,2,4-trimethylhexamethylene. Particularly preferred is 2,2,4-trimethylhexamethylene.

As used herein, "alkoxy" means a straight-chain or branched alkyl group, which is bonded to the compound via an oxygen atom (—O—). The term "alkoxy with n to m carbon atoms" means an alkoxy with n to m carbon atoms. If not denoted otherwise, "alkoxy" means a straight-chain or branched alkyl group with 1 to 6 carbon atoms. In the context of the present invention, preferred alkoxy groups are straight-chain or branched alkoxy groups with 1 to 4 carbon atoms.

As used herein, "alkenyl" means a straight-chain or branched hydrocarbon group comprising a carbon-carbon double bond. The term "alkenyl with n to m carbon atoms" means an alkenyl with n to m carbon atoms. If not denoted otherwise, "alkenyl" means a straight-chain or branched hydrocarbon group comprising a carbon-carbon double bond in any desired position and 2 to 10 carbon atoms. In the context of the present invention, preferred alkenyl groups comprise a carbon-carbon double bond in any desired position and 2 to 6, more preferably 2 to 4 carbon atoms. Examples of alkenyl groups include, but are not limited to ethenyl, 1-propenyl, 2-propenyl, isopropenyl, 1-butenyl, 2-butenyl, 3-butenyl and isobutenyl. Preferred examples are 1-propenyl and 2-propenyl.

As used herein the term "monocarbocyclic aliphatic group" means a cycloalkylene group.

As used herein, "cycloalkylene" means a difunctional carbocyclic saturated ring system. The term "cycloalkylene with n to m carbon atoms" means a cycloalkylene with n to m carbon atoms. If not denoted otherwise, "cycloalkylene" means a cycloalkylene group with 3 to 8 carbon atoms. In the context of the present invention preferred cycloalkylene groups are cycloalkylene groups with 5 to 7, more preferably 5 or 6 carbon atoms. Examples include, but are not limited to cyclopropylene, cyclobutylene, cyclopentylene, cyclohexylene, cycloheptylene or cyclooctylene, preferably cyclopentylene and cyclohexylene.

As used herein, "dicarbocyclic aliphatic group" means a difunctional bicyclic condensed, bridged or fused saturated ring system. If not denoted otherwise, "dicarbocyclic aliphatic group" means a difunctional bicyclic condensed, bridged or fused saturated ring system with 9 to 20 carbon atoms. Examples include, but are not limited to decalinyl, hydrindanyl and norbornyl.

As used herein, the term "bridged multicyclic aliphatic group" means a group comprising two or more mono- or dicarbocyclic aliphatic groups, which are linked to each other by a direct carbon-carbon bond or by a difunctional group such as —O—, —S— or alkylene with 1 to 3 carbon atoms; preferably the term "bridged multicyclic aliphatic group" means two monocyclic aliphatic groups, which are linked to each other by a direct carbon-carbon bond or by a difunctional group such as —O—, —S— or alkylene with 1 to 3 carbon atoms; particularly preferred the term "bridged multicyclic aliphatic group" means two cyclohexylene rings, which are linked to each other by a direct carbon-carbon bond or by a difunctional group such as —O—, —S— or alkylene with 1 to 3 carbon atoms.

As used herein, the term "heterocyclic aliphatic group" means a difunctional saturated ring system which, in addition to carbon atoms, comprises one, two or three atoms selected from nitrogen, oxygen and/or sulfur. Preferred heterocyclic aliphatic groups are those containing 4 to 5 carbon atoms and one nitrogen, oxygen or sulfur atom.

As used herein, the term "mono- or dicarbocyclic aromatic group" means a difunctional mono- or dicyclic aromatic system, preferably with 6 to 12 carbon atoms, preferably a monocyclic aromatic system. Examples include, but are not limited to, toluene, phenylene, naphthylene, tetrahydronaphthylene, indenylene, indanylene, pentalenylene, fluorenylene and the like, preferably toluene, phenylene or indanylene.

As used herein, the term "bridged multicyclic aromatic group" means a group comprising two or more mono- or dicarbocyclic aromatic groups, preferably with 6 to 12 carbon atoms each, which are linked to each other by a direct carbon-carbon bond or by a difunctional group such as —O—, —S— or alkylene with 1 to 3 carbon atoms; preferably the term "bridged multicyclic aromatic group" means two monocyclic aromatic groups, which are linked to each other by a direct carbon-carbon bond or by a difunctional group such as —O—, —S— or alkylene with 1 to 3 carbon atoms; particularly preferred the term "bridged multicyclic aromatic group" means two phenylene rings, which are linked to each other by a direct carbon-carbon bond or by a difunctional group such as —O—, —S— or alkylene with 1 to 3 carbon atoms.

As used herein, the term "heterocyclic aromatic group" means a monocyclic aromatic 5- or 6-membered ring, which comprises one, two or three atoms selected from nitrogen, oxygen and/or sulfur, or a bicyclic aromatic group comprising two 5- or 6-membered rings, in which one or both rings can contain one, two or three atoms selected from nitrogen, oxygen or sulfur. Examples include, but are not limited to pyridyl, pyrazinyl, pyrimidinyl, pyridazinyl, oxazolyl, oxydiazolyl, isoxazolyl, thiadiazolyl, tetrazolyl, pyrazolyl, imidazolyl, thiazolyl, thienyl, quinolinyl, isoquinolinyl, cinnolinyl, pyrazolo[1,5-a]pyridyl, imidazo[1,2-a]pyridyl, quinoxalinyl, benzothiazolyl, benzotriazolyl, indolyl, indazolyl.

As used herein, the addition of the terms "unsubstituted" or "substituted" means that the respective groups are unsubstituted or carry from 1 to 4 substituents selected from alkyl, alkoxy and halogen. Preferred substituents are methyl or ethyl.

As used herein, the terms "X-functional group", "Y-functional group" and "Z-functional group" respectively, means a group, which is bonded to the remainder of the compound via X-, Y- or Z-bond(s), respectively. Preferably, the "X-functional group", "Y-functional group" and "Z-functional group" is a difunctional group, i.e. X, Y and Z are preferably 2.

As used herein, the term "difunctional group" means a group, which is bonded to the remainder of the compounds via two bonds. Difunctional groups include but are not limited to, difunctional aliphatic groups and difunctional aromatic groups. Difunctional aliphatic groups include but are not limited to the following groups:

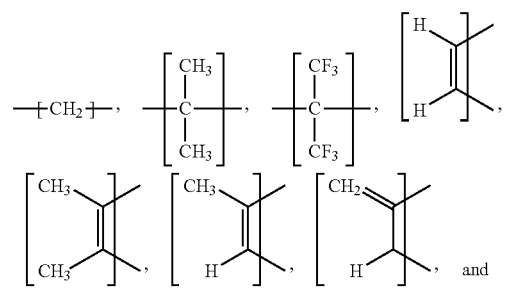

13

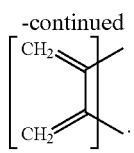

Difunctional aromatic groups include but are not limited to the following groups:

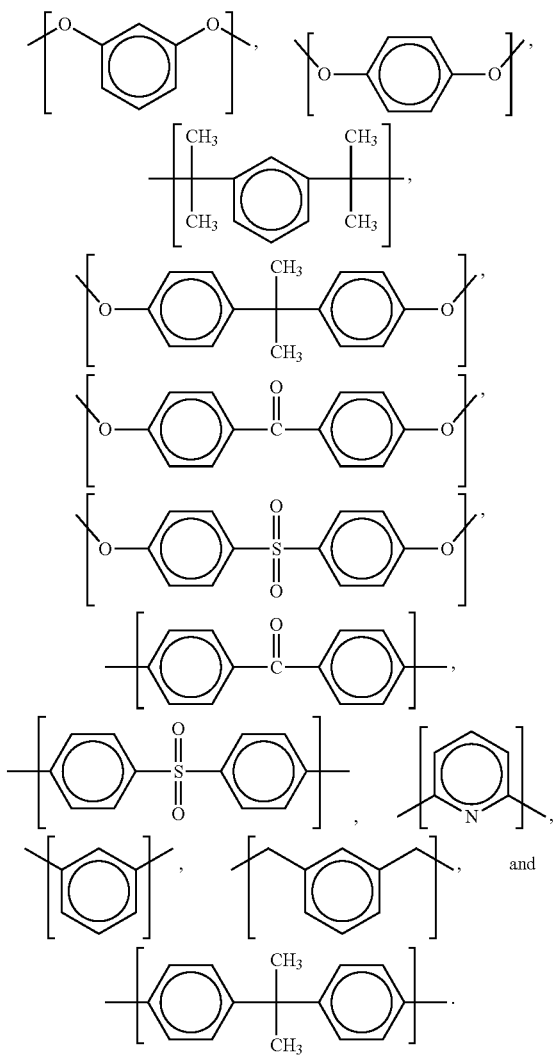

Further difunctional groups include, but are not limited to the following groups:

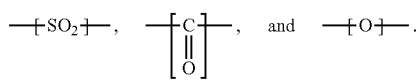

As used herein, the term "Glass transition temperature" or "Tg" means the temperature of reversible transition of an amorphous solid, e.g. polymer, between high elastic state and vitreous (glassy) state, when the polymer becomes brittle on cooling, or soft on heating. More specifically, it defines a pseudo second order phase transition, in which a supercooled melt yields, on cooling, a glassy structure and properties similar to those of crystalline materials, e.g. of an isotropic solid material.

As used herein, the term "flexural modulus" means a measure of the stiffness of a material. Within the limits of elasticity, modulus is the ratio of the linear stress to the linear strain, which can be determined from the slope of a stress-strain curve created during flexural testing.

DETAILED DESCRIPTION OF THE INVENTION

The present invention, in one aspect, relates to a curable mixture comprising:

RM % of m-xylylene bismaleimide of formula (I)

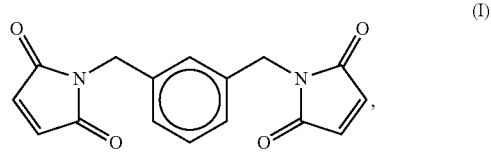

RP % of a polyimide component, and
RC % of a comonomer component,
wherein
the polyimide component consists of at least one polyimide of formula (II)

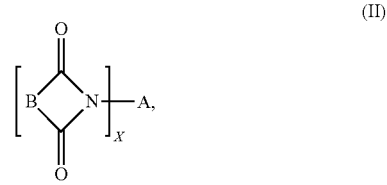

wherein
A is an X-functional group with at least two carbon atoms,
X is an integer ≥2, and
B is a difunctional organic group comprising a carbon-carbon double bond;
with the proviso that when B is

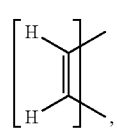

A cannot be

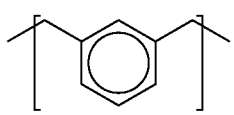

and X cannot be 2;
wherein the comonomer component consists of at least one comonomer selected from:
alkenylphenol, alkenylphenyl ether, alkenylphenol ether, polyamine, aminophenol, amino acid hydrazide, cyanate ester, diallyl phthalate, triallyl isocyanurate, triallyl cyanurate, styrene, and divinylbenzene;

and wherein

RM % is defined as 1 wt % to 98 wt %;

RP % is defined as 1 wt % to 98 wt %;

RC % is defined as 1 wt % to 98 wt %;

and wherein the sum of RM %, RP % and RC % is less than or equal to 100 wt %.

It has now been surprisingly and unexpectedly found that the curable mixtures as defined above can be processed to tough and temperature resistant cured products via solutions and hot melts. Further, it has been found that the curable mixtures of the invention as defined above are stable upon storage with no crystallisation.

The m-xylylene bismaleimide of formula (I), the polyimide components, and the comonomers are commercially available, or can be obtained by processes known to the skilled person. Methods for the preparation of polyimide components of formula (II) and structures are described in U.S. Pat. Nos. 3,127,414, 3,839,358, 4,229,351, 4,855,450, and 5,747,615. Alkenylphenols, alkenyl phenyl ethers and phenyl allyl ethers are described in U.S. Pat. Nos. 4,100,140, 4,789,704, 4,981,934, 4,632,966, and 4,853,449. All polyimide components and comonomers used in the Examples of the invention described herein are commercially available, e.g. from Evonik Industries, Lonza (cyanate ester), and TCI Europe N.V. (bis(3-methyl-5-ethyl-4-maleimidophenyl)methane).

In one embodiment, in the polyimide of formula (II), X is an integer from 2 to 4. Particularly preferred X is 2.

In one embodiment, in the polyimide of formula (II), A is selected from the following difunctional groups:

h) alkylene with 2 to 12 carbon atoms;

i) a mono- or dicarbocyclic aliphatic group;

j) a bridged multicyclic aliphatic group;

k) a heterocyclic aliphatic group;

l) a mono- or dicarbocyclic aromatic group;

m) a bridged multicyclic aromatic group;

n) a heterocyclic aromatic group;

(h) one of the following groups:

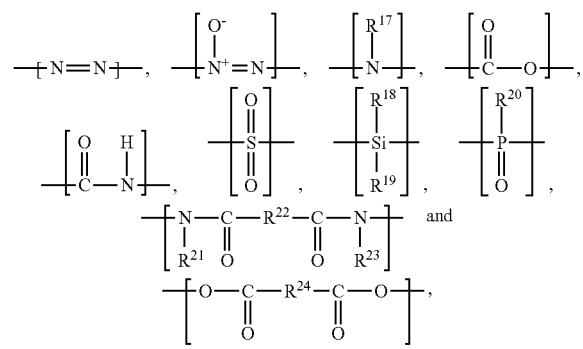

wherein $R^{17}$, $R^{18}$, $R^{19}$, $R^{20}$, $R^{21}$ and $R^{23}$ are identical or different and each is independently from the other alkyl with 1 to 6 carbon atoms, preferably $R^{17}$, $R^{18}$, $R^{19}$, $R^{20}$, $R^{21}$ and $R^{23}$ are methyl;

and wherein $R^{22}$ and $R^{24}$ are identical or different and each is independently from the other alkylene with 1 to 6 carbon atoms; preferably $R^{22}$ and $R^{24}$ are methylene;

(i) a group defined by formula (IX)

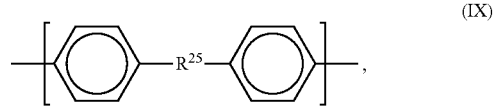

wherein $R^{25}$ is selected from the following groups:

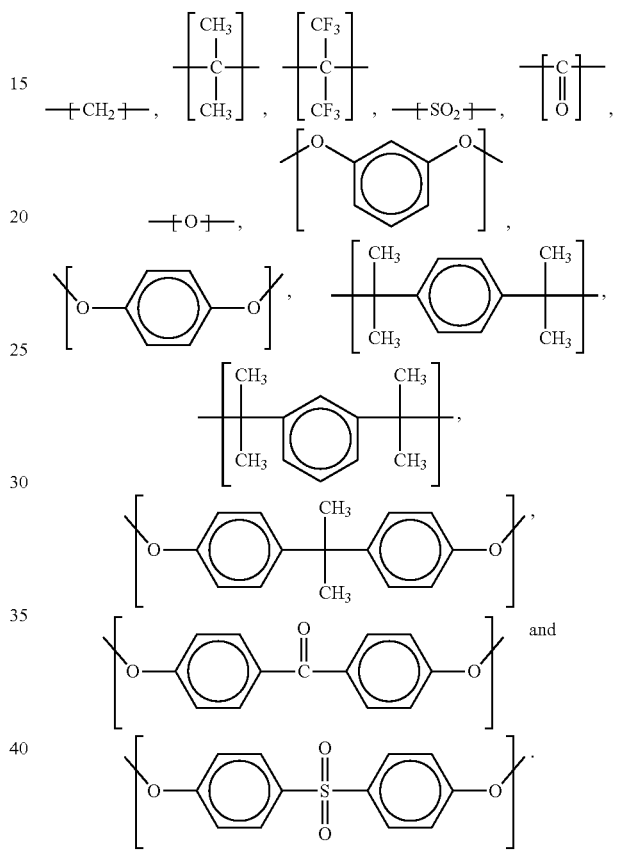

In one embodiment, in the polyimide of formula (II), A is selected from the following difunctional groups:

a) substituted or unsubstituted alkylene with 2 to 6 carbon atoms, preferably 2,2,4-trimethylhexamethylene;

b) substituted or unsubstituted cycloalkylene with 5 to 6 carbon atoms, preferably cyclopentylene or cyclohexylene;

c) two monocyclic aliphatic groups, which are linked to each other by a direct carbon-carbon bond or by a difunctional group such as —O—, —S— or alkylene with 1 to 3 carbon atoms;

d) a heterocyclic group with 4 to 5 carbon atoms and one nitrogen, oxygen or sulfur atom;

e) a monocyclic aromatic system with 6 to 12 carbon atoms;

f) two monocyclic aromatic groups, which are linked to each other by a direct carbon-carbon bond or by a difunctional group such as —O—, —S— or alkylene with 1 to 3 carbon atoms;

g) an aromatic or partly unsaturated 5- or 6-membered ring which comprises one, two or three atoms selected from nitrogen, oxygen and/or sulphur; and (i) a group defined by formula (IX)

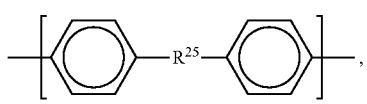

wherein $R^{25}$ is

In a preferred embodiment, in the polyimide of formula (II), A is selected from the following difunctional groups: ethylene, 2,2,4-trimethylhexamethylene, hexamethylene, cyclohexylene, dicylohexylmethylene, 3,3'-diphenylsulfonylene, 1,3-benzene, 1,2-benzene, 2,4-toluene, 2,6-toluene,

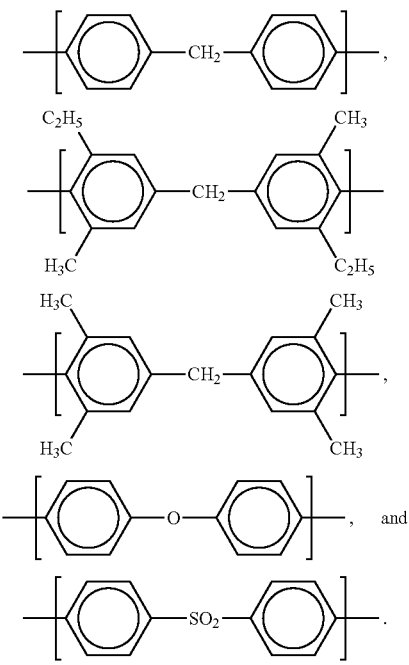

In one embodiment, in the polyimide of formula (II), B is selected from the following groups:

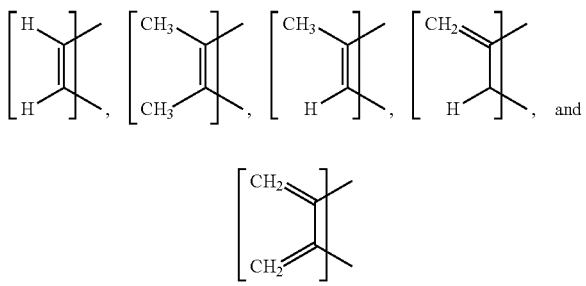

Preferably, B is selected from the following groups:

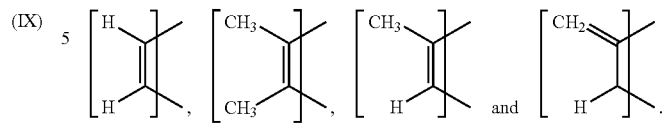

In a particularly preferred embodiment, B is

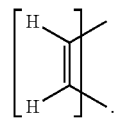

In a preferred embodiment, the polyimide component consists of at least one polyimide selected from 4,4'-bismaleimidodiphenylmethane, bis(3-methyl-5-ethyl-4-maleimidophenyl)methane, bis(3,5-dimethyl-4-maleimidophenyl)methane, 4,4'-bismaleimidodiphenyl ether, 4,4'-bismaleimidodiphenylsulfone, 3,3'-bismaleimidodiphenylsulfone, bismaleimidodiphenylindane, 2,4-bismaleimidotoluene, 2,6-bismaleimidotoluene, 1,3-bismaleimidobenzene, 1,2-bismaleimidobenzene, 1,4-bismaleimidobenzene, 1,2-bismaleimidoethane, 1,6-bismaleimidohexane, 1,6-bismaleimido-(2,2,4-trimethyl)hexane, 1,6-bismaleimido-(2,4,4-trimethyl)hexane, 1,4-bismaleimidocyclohexane, 1,3-bis(maleimidomethyl)cyclohexane, 1,4-bis(maleimidomethyl)cyclohexane, and 4,4'-bismaleimidodicyclohexylmethane.

In one embodiment, the comonomer component consists of at least one comonomer selected from:

(a) a compound of formula (III)

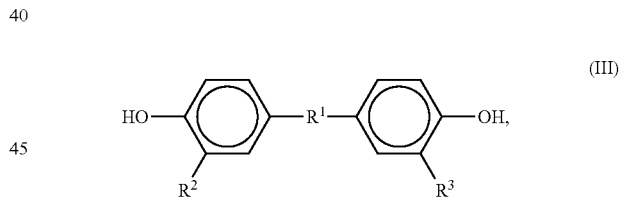

wherein $R^1$ is a difunctional group, and $R^2$ and $R^3$ are identical or different and each is independently from the other alkenyl with 2 to 6 carbon atoms;

(b) a compound of formula (IV)

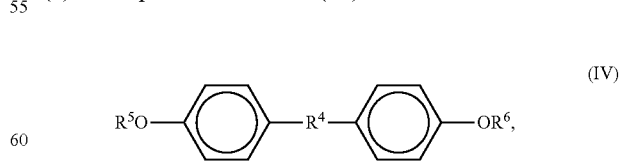

wherein $R^4$ is a difunctional group, and $R^5$ and $R^6$ are identical or different and each is independently from the other alkenyl with 2 to 6 carbon atoms;

(c) a compound of formula (V)

$$\text{(V)}$$

wherein
$R^8$ is a difunctional group, and
$R^7$ and $R^9$ are identical or different and each is independently from the other alkenyl with 2 to 6 carbon atoms;

(d) a compound of formula (VI)

$$\text{(VI)}$$

wherein
$R^{11}$ is a difunctional group, and
$R^{10}$ and $R^{12}$ are identical or different and each is independently from the other alkenyl with 2 to 6 carbon atoms;

(e) a compound of formula (VII)

$$\text{(VII)}$$

wherein
$R^{13}$ is a Y-functional group,
$R^{14}$ is alkenyl with 2 to 6 carbon atoms, and
Y is an integer ≥1; and (f) a compound of formula (VIII)

$$\text{(VIII)}$$

wherein
$R^{15}$ is a Z-functional group,
$R^{16}$ is alkenyl with 2 to 6 carbon atoms, and
Z is an integer ≥1.

In one embodiment, in the compound of formula (III), $R^1$ is selected from the following groups:

In a particular preferred embodiment, $R^1$ is

In one embodiment, in the compound of formula (III), $R^2$ and $R^3$, are identical and are 1-propenyl or 2-propenyl; preferably 1-propenyl.

In a particular preferred embodiment, the compound of formula (III) is 3,3'-diallyl-bisphenol A of formula (IIIa)

$$\text{(IIIa)}$$

In one embodiment, in the compound of formula (IV), $R^4$ is selected from the following groups:

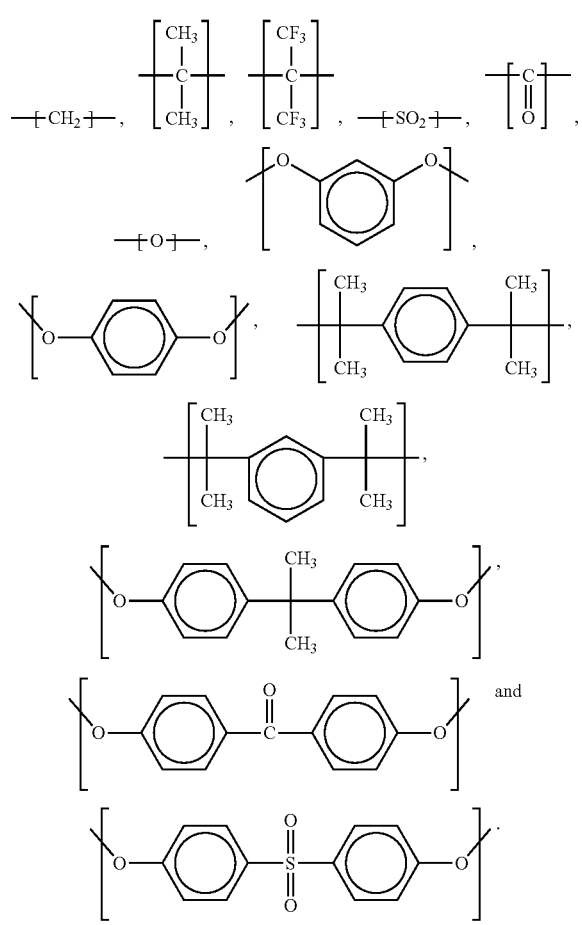

In a particular preferred embodiment, $R^4$ is

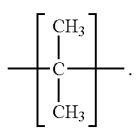

In one embodiment, in the compound of formula (IV), $R^5$ and $R^6$, are identical and are 1-propenyl or 2-propenyl; preferably 1-propenyl.

In a particular preferred embodiment, the compound of formula (IV) is diallyl ether of bisphenol A of formula (IVa)

(IVa)

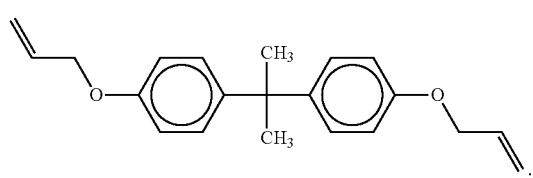

In one embodiment, in the compound of formula (V), $R^8$ is a difunctional aromatic group. In a preferred embodiment, $R^8$ is selected from the following groups:

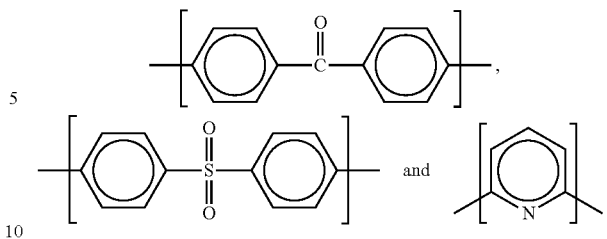

In a particularly preferred embodiment, $R^8$ is

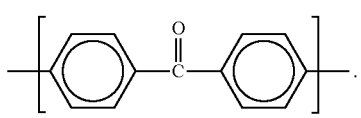

In one embodiment, in the compound of formula (V), $R^7$ and $R^9$, are identical and are 1-propenyl or 2-propenyl; preferably 1-propenyl.

In a particular preferred embodiment, the compound of formula (V) is bis-(o-propenylphenoxy)benzophenone of formula (Va)

(Va)

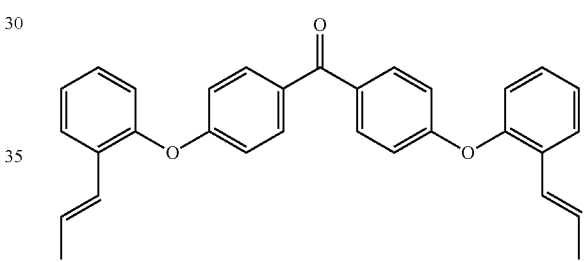

In one embodiment, in the compound of formula (VI), $R^{11}$ is a difunctional aromatic group. In a preferred embodiment, $R^{11}$ is selected from the following groups:

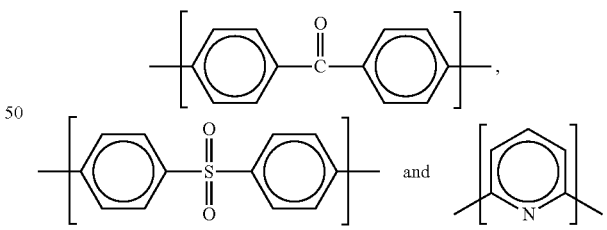

In a particularly preferred embodiment, $R^{11}$ is

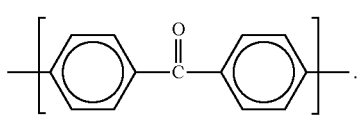

In one embodiment, in the compound of formula (VI), $R^{10}$ and $R^{12}$, are identical and are 1-propenyl or 2-propenyl; preferably 1-propenyl.

In one embodiment, in the compound of formula (VII), Y is an integer from 1 to 4, preferably from 1 or 2. Particularly preferred Y is 2.

In one embodiment, in the compound of formula (VII), $R^{13}$ is a difunctional aromatic group. In a preferred embodiment, $R^{13}$ is selected from the following groups:

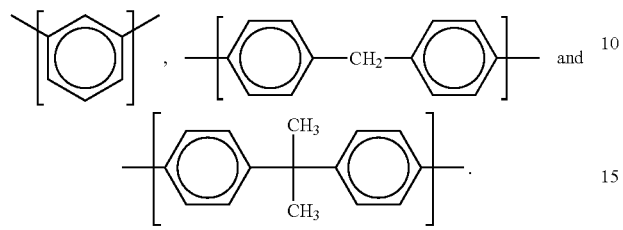

In one embodiment, in the compound of formula (VII), $R^{14}$ is 1-propenyl or 2-propenyl; preferably 1-propenyl.

In one embodiment, in the compound of formula (VIII), Z is an integer from 1 to 4, preferably from 1 or 2. Particularly preferred Z is 2.

In one embodiment, in the compound of formula (VIII), $R^{15}$ is a difunctional aromatic group. In a preferred embodiment, $R^{15}$ is selected from the following groups:

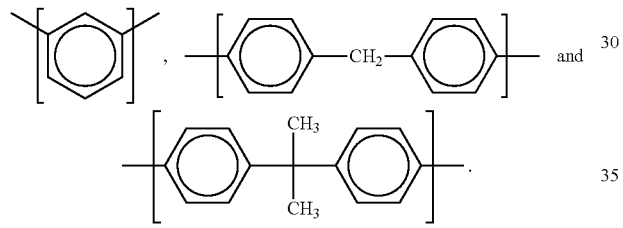

In one embodiment, in the compound of formula (VIII), $R^{16}$ is 1-propenyl or 2-propenyl; preferably 1-propenyl.

In a preferred embodiment, the comonomer component consists of at least one comonomer selected from: 3,3'-diallylbisphenol A, diallyl ether of bisphenol A, bis-(opropenylphenoxy)benzophenone, m-aminobenzhydrazide, bisphenol A dicyanate ester, diallyl phthalate, triallyl isocyanurate, triallyl cyanurate, styrene, and divinylbenzene.

Particularly preferred, the comonomer component consists of at least one comonomer selected from: 3,3'-diallylbisphenol A, diallyl ether of bisphenol A, bis-(o-propenylphenoxy)benzophenone, m-aminobenzhydrazide, and bisphenol A dicyanate ester.

In one embodiment, the polyimide component consists of at least one polyimide selected from 4,4'-bismaleimidodiphenylmethane, bis(3-methyl-5-ethyl-4-maleimidophenyl)methane, bis(3,5-dimethyl-4-maleimidophenyl)methane, 4,4'-bismaleimidodiphenyl ether, 4,4'-bismaleimidodiphenylsulfone, 3,3'-bismaleimidodiphenylsulfone, bismaleimidodiphenylindane, 2,4-bismaleimidotoluene, 2,6-bismaleimidotoluene, 1,3-bismaleimidobenzene, 1,2-bismaleimidobenzene, 1,4-bismaleimidobenzene, 1,2-bismaleimidoethane, 1,6-bismaleimidohexane, 1,6-bismaleimido-(2,2,4-trimethyl)hexane, 1,6-bismaleimido-(2,4,4-trimethyl)hexane, 1,4-bismaleimidocyclohexane, 1,3-bis(maleimidomethyl)cyclohexane, 1,4-bis(maleimidomethyl)cyclohexane, and 4,4'-bismaleimidodicyclohexylmethane, and the comonomer component consists of at least one comonomer selected from:

(a) a compound of formula (III)

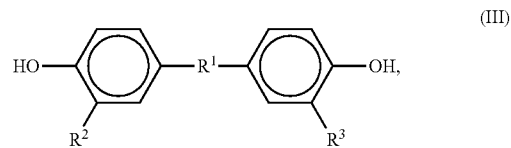

wherein
$R^1$ is a difunctional group, and
$R^2$ and $R^3$ are identical or different and each is independently from the other alkenyl with 2 to 6 carbon atoms;

(b) a compound of formula (IV)

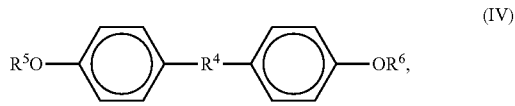

wherein
$R^4$ is a difunctional group, and
$R^5$ and $R^6$ are identical or different and each is independently from the other alkenyl with 2 to 6 carbon atoms; and (c) a compound of formula (V)

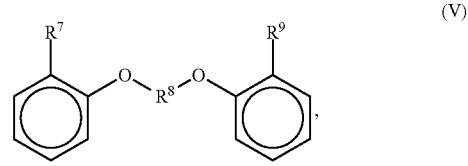

wherein
$R^8$ is a difunctional group, and
$R^7$ and $R^9$ are identical or different and each is independently from the other alkenyl with 2 to 6 carbon atoms.

In one embodiment, the polyimide component consists of at least one polyimide selected from 4,4'-bismaleimidodiphenylmethane, bis(3-methyl-5-ethyl-4-maleimidophenyl)methane, bis(3,5-dimethyl-4-maleimidophenyl)methane, 4,4'-bismaleimidodiphenyl ether, 4,4'-bismaleimidodiphenylsulfone, 3,3'-bismaleimidodiphenylsulfone, bismaleimidodiphenylindane, 2,4-bismaleimidotoluene, 2,6-bismaleimidotoluene, 1,3-bismaleimidobenzene, 1,2-bismaleimidobenzene, 1,4-bismaleimidobenzene, 1,2-bismaleimidoethane, 1,6-bismaleimidohexane, 1,6-bismaleimido-(2,2,4-trimethyl)hexane, 1,6-bismaleimido-(2,4,4-trimethyl)hexane, 1,4-bismaleimidocyclohexane, 1,3-bis(maleimidomethyl)cyclohexane, 1,4-bis(maleimidomethyl)cyclohexane, and 4,4'-bismaleimidodicyclohexylmethane;

and
the comonomer component consists of at least one comonomer selected from 3,3'-diallylbisphenol A, 3,3'-diallylbisphenol F, diallyl ether of disphenol A, diallyl ether of bisphenol F, bis-(o-propenylphenoxy)benzophenone, bis-(2-methoxy-4-propenylphenoxy)benzophenone, bisphenol A dicyanate ester, diallyl phthalate, triallyl isocyanurate, triallyl cyanurate, styrene, divinylbenzene, 4,4'-diaminodiphenylmethane, 1,3-diaminobenzene (m-phenylenediamine), 4,4'-bis(4-aminocycloheyl)methane, m-aminobenzhydrazide;
and
RM % is defined as ranging from 20 wt % to 40 wt %; and RP % is defined as ranging from 10 wt % to 70 wt %; and RC % is defined as ranging from 10 wt % to 50 wt %; and the sum of RM %, RP % and RC % is defined to be less than or equal to 100 wt %.

In one embodiment, the polyimide component consists of at least one polyimide selected from bis(3-methyl-5-ethyl-4-maleimidophenyl)methane, bis(3,5-dimethyl-4-maleimidophenyl)methane, 3,3'-bismaleimidodiphenylsulfone, bismaleimidodiphenylindane, 1,2-bismaleimidobenzene, 1,6-bismaleimido-(2,4,4-trimethyl)hexane, 1,4-bismaleimidocyclohexane, 1,3-bis(maleimidomethyl)cyclohexane, 1,4-bis(maleimidomethyl)cyclohexane;
and
the comonomer component consists of at least one comonomer selected from 3,3'-diallylbisphenol A, 3,3'-diallylbisphenol F, diallyl ether of bisphenol A, diallyl ether of bisphenol F, bis-(o-propenylphenoxy)benzophenone, bis-(2-methoxy-4-propenylphenoxy)benzophenone, bisphenol A dicyanate ester, diallyl phthalate, triallyl isocyanurate, triallyl cyanurate, styrene, divinylbenzene, 4,4'-diaminodiphenylmethane, 1,3-diaminobenzene (m-phenylenediamine), 4,4'-bis(4-aminocycloheyl)methane, m-aminobenzhydrazide;
and
RM % is defined as ranging from 20 wt % to 40 wt %; and RP % is defined as ranging from 10 wt % to 70 wt %; and RC % is defined as ranging from 10 wt % to 50 wt %; and the sum of RM %, RP % and RC % is defined to be less than or equal to 100 wt %.

In one embodiment, RM % is defined as ranging from 1 wt % to 95 wt %; e.g. from 1 wt % to 90 wt %, from 1 wt % to 85 wt %, from 1 wt % to 80 wt %, from 1 wt % to 75 wt %, from 5 wt % to 70 wt %, from 10 wt % to 70 wt %, or from 10 wt % to 65 wt %.

In one embodiment, RP % is defined as ranging from 1 wt % to 95 wt %; e.g. from 1 wt % to 90 wt %, from 1 wt % to 85 wt %, from 1 wt % to 80 wt %, from 1 wt % to 75 wt %, from 1 wt % to 70 wt %, from 1 wt % to 65 wt %, from 1 wt % to 60 wt %, from 2 wt % to 55 wt %, from 2 wt % to 50 wt % or from 5 wt % to 50 wt %.

In one embodiment, RC % is defined as ranging from 5 wt % to 95 wt %; e.g. from 10 wt % to 90 wt %, from 15 wt % to 85 wt %, from 20 wt % to 80 wt %, from 20 wt % to 75 wt %, from 20 wt % to 70 wt %, from 21 wt % to 65 wt %, from 22 wt % to 60 wt %, from 23 wt % to 55 wt %, from 24 wt % to 50 wt % or from 25 wt % to 45 wt %.

In a preferred embodiment, RM % is defined as 5 wt % to 70 wt %; RP % is defined as 1 wt % to 60 wt %; and RC % is defined as 20 wt % to 80 wt %.

It has been found that curable mixtures, wherein RM % ranges from 10 wt % to 65 wt %, have a very low viscosity at temperatures ranging from 70° C. to 100° C. without crystallization. A further advantage of such curable mixtures of the present invention is the stability of their viscosity at the processing temperature, which allows economic fabrication of complex and large components.

Particularly preferred curable mixtures are shown in Table 1 below:

TABLE 1

| No. | MXBI | RM % (wt %) | Polyimide component | RP % (wt %) | Comonomer component | RC % (wt %) |
|---|---|---|---|---|---|---|
| 1 | MXBI | 10-65 | MDAB | 5-50 | 3,3'-diallylbisphenol A | 25-45 |
| 2 | MXBI | 10-65 | bis-(3-methyl-5-ethyl-4-maleimidophenyl) methane | 5-50 | bisphenol A diallyl ether | 25-45 |
| 3 | MXBI | 10-65 | bis-(3-methyl-5-ethyl-4-maleimidophenyl) methane | 5-50 | bisphenol A dicyanate | 25-45 |
| 4 | MXBI | 10-65 | MDAB | 5-50 | bisphenol A dicyanate | 25-45 |
| 5 | MXBI | 10-65 | bis-(3-methyl-5-ethyl-4-maleimidophenyl) methane | 5-50 | 3,3'-diallylbisphenol A | 25-45 |
| 6 | MXBI | 10-65 | bis-(3-methyl-5-ethyl-4-maleimidophenyl) methane | 5-50 | BOAP | 25-45 |

MXBI = m-xylylene bismaleimide;
MDAB = 4,4'-bismaleimidodiphenylmethane;
BOAP = bis-(o-propenylphenoxy)benzophenone.

For many technical applications of the curable mixtures of this invention it is advantageous to accelerate cure by the addition of catalysts.

Therefore, in one embodiment, the curable mixture of the invention further comprises one or more cure accelerators.

Cure accelerators comprise effective curing catalysts including e.g. basic catalysts, include but are not limited to tertiary amines such as triethylamine, dimethylaniline, and heterocyclic bases such as azabicyclooctane, chinoline, imidazole as well as their homologues, and quaternary ammonium compounds. Also, tertiary phosphines such as triphenylphosphine and quaternary phosphonium compounds such as triphenylmethylphosphonium bromide are efficient catalysts. Further suitable cure accelerators include e.g. radical type catalysts such as peroxides, hydroperoxides, and azo-compounds, e.g. azobis-iso-butyronitrile.

In one embodiment, the cure accelerator is present in the curable mixture in an amount ranging from 0.05 wt % to 1 wt %, preferably from 0.06 wt % to 0.09 wt % based on the total weight of the curable mixture.

For many technical applications of the curable mixtures it is advantageous to retard the polymerisation by the addition of reaction inhibitors in order to improve the processability.

Therefore, in another embodiment, the curable mixture of the invention further comprises one or more cure inhibitors. Suitable cure inhibitors include but are not limited to are hydroquinone, 1,4-naphthoquinone and phenothiazine. It is advantageous to dissolve the inhibitor in one of the components prior to the preparation of the mixture.

In one embodiment, the cure inhibitor is present in the curable mixture in an amount ranging from 0.1 wt % to 2 wt %, preferably from 0.05 wt % to 1 wt % based on the total weight of the curable mixture.

The above-identified cure accelerators and cure inhibitors are known in the art and are commercially available.

It has now been found that the curable mixture of the invention is useful for the preparation of prepolymers and of crosslinked polymers.

Therefore, in one aspect, the present invention relates to the use of a curable mixture for the preparation of a prepolymer or of a crosslinked polymer.

Further, it has been found that the curable mixtures of the invention are stable upon storage with no crystallisation.

In addition, the curable mixtures of the invention may be processed via solutions because they are soluble in 1,3-dioxolane or 1,3-dioxolane-containing solvent mixtures in concentrations between 45 and 65 wt %.

Methods for the Preparation of a Curable Mixture of the Invention

Melt Process

In one aspect, the invention relates to a method for the preparation of a curable mixture as defined above, comprising the step of:

blending a comonomer component as defined above, a polyimide component as defined above, and a maleimide of formula (I) as defined above at a temperature ranging from 60° C. to 180° C. to obtain a curable mixture as a low melting low viscosity mass (resin).

In the practice of this method, the blending temperatures may be varied over a relatively wide range. In one embodiment, the method is carried out at temperatures from 90° C. to 170° C., preferably from 100° C. to 160° C.

Solution Process

In one aspect, the invention relates to a method for the preparation of a curable mixture as defined above, comprising the steps of:

dissolving a comonomer component as defined above, a polyimide component as defined above, and a maleimide of formula (I) as defined above in a solvent, and stripping off the solvent, to obtain a curable mixture as a solvent-free, low melting, low viscosity mass (resin).

In one embodiment, the comonomer component as defined above, the polyimide component as defined above, and the maleimide of formula (I) as defined above are dissolved in the solvent at elevated temperature.

Suitable solvents are all customary inert organic solvents. They include but are not limited to ketones such as acetone, methylethylketone, cyclohexanone; glycol ethers such as methyl glycol, methyl glycol acetate, propylene glycol monomethyl ether (methyl proxitol), methyl proxitol acetate, diethylene glycol, and diethylene glycol monomethyl ether; toluene and xylene, preferably in combination with 1,3-dioxolane as a co-solvent.

In a preferred embodiment, the solvent is 1,3-dioxolane or a 1,3-dioxolane-containing solvent.

In one embodiment, the amount of 1,3-dioxolane in the solvent mixture ranges from 20 wt % to 80 wt %, e.g. from 30 wt % to 70 wt % or from 40 wt % to 60 wt %.

In the practice of the methods for the preparation of the curable mixture, i.e. in the melt process and in the solution process, the molar ratio between the unsaturated imide groups and reactive alkenyl groups in the mixture ranges from 1.0 to 0.1, e.g. from 1.0 to 0.2, from 1.0 to 0.3, from 1.0 to 0.4, from 1.0 to 0.5, from 1.0 to 0.6, from 1.0 to 0.7 or from 1.0 to 0.8 in order to achieve the desired properties such as high glass transition temperature and high toughness of the cured mixtures.

The preparation of the curable mixtures of the invention can be performed via the usual techniques for blending of components by powder blending, melt blending, and solution blending in suitable solvents.

The curable mixture of the invention can be isolated by customary techniques and processes (compare also the Examples).

Prepolymers of the Curable Mixture and Method for the Preparation of a Prepolymer of the Invention It has been found that the curable mixtures of the invention are useful for the preparation of prepolymers. For this technology it is necessary that the curable mixtures can be processed to low-viscosity, crystallisation-stable melts or solutions thereof with sufficiently high concentration.

Thus, in one aspect, the invention relates to the use of a curable mixture as defined above for the preparation of a prepolymer.

In one aspect, the present invention relates to a method for the preparation of a curable prepolymer comprising the step of:

keeping a curable mixture as defined above at a temperature ranging from 25° C. to 280° C., if appropriate in the presence of a solvent, for a time sufficient to obtain a prepolymer, which is still formable upon the application of heat and/or pressure.

In the practice of this method, the reaction temperatures may be varied over a relatively wide range. The method is generally carried out at temperatures from 25° C. to 280° C., preferably at temperatures from 40° C. to 220° C., more preferably from 60° C. to 200° C., particularly preferred from 80° C. to 180° C.

If the method is carried out in the presence of a solvent, high boiling point polar solvents such as dimethylformamide, dimethylacetamide, N-methylpyrrolidone, and butyrolactone can in principle be used. However, the use of such solvents generally yields prepolymers with high contents of residual solvents.

If the method is carried out in the presence of a solvent, in one embodiment 1,3-dioxolane low boiling solvent mixtures containing 1,3-dioxolane may be used. These preferably include, but are not limited to, solvent mixtures of 1,3-dioxolane with ketones such as acetone, methylethylketone, cyclohexanone or glycol ethers such as ethylene glycol ether, propylene glycol ether, butylene glycol ether and their acetates.

Due to the low boiling point of solvent mixtures comprising 1,3-dioxolane and the above-identified solvents, such solvent mixtures are useful for the preparation of solvent free prepolymers. Further, the so obtained prepolymers can be processed to void-free fiber-reinforced composites.

In one embodiment, the solvent mixture comprises up to 50 wt %, preferably up to 40 wt % of ketones such as acetone, methylethylketone, cyclohexanone, or glycol ethers such as ethylene glycol ether, propylene glycol ether, butylene glycol ether, and their acetates based on the total weight of the solvent mixture.

In one embodiment, a solution of the curable mixture of the invention comprises from 30 wt % to 70 wt %, preferably from 40 wt % to 60 wt % of solvent, e.g. of 1,3-dioxolane, or solvent mixtures comprising 1,3-dioloxane, and the above-identified solvents. Such concentrations are typically used in industrial dip coating processes.

The prepolymers of the curable mixture of the invention can be isolated by generally customary processes (compare also the Examples), e.g. by evaporation of the solvent is the subsequent use is solvent free.

The prepolymers which are obtained according to the method of the invention are still soluble in selected organic solvents. Further, the prepolymers of the invention are still fusible and formable upon the application of heat and/or pressure.

In another aspect, the present invention relates to a curable prepolymer obtainable according to a method as described above.

Crosslinked Polymers of the Curable Mixture and Method for the Preparation of a Crosslinked Polymer of the Invention It has been found that the curable mixtures and curable prepolymers of the invention are useful for the preparation of crosslinked polymers.

In one aspect, the invention relates to the use of a curable mixture as defined above or of a prepolymer as defined above for the preparation of a crosslinked polymer.

In one aspect, the invention relates to a method for the preparation of a crosslinked polymer comprising the step of: heating a curable mixture as defined above or a curable prepolymer as defined above to a temperature ranging from 70° C. to 280° C. for a time sufficient to complete cure.

In the practice of this method, the reaction temperatures may be varied over a relatively wide range. In one embodiment, the method is carried out at temperatures from 80° C. to 270° C., more preferably from 90° C. to 260° C., most preferably from 100° C. to 250° C.

In one embodiment, the conversion of a curable mixture as defined above or of a curable prepolymer as defined above into a crosslinked (cured) polymer may be carried out in the presence of a curing catalyst.

Curing catalysts, e.g. basic catalysts, include but are not limited to tertiary amines such as triethylamine, dimethylaniline, and heterocyclic bases such as azabicyclooctane, chinoline, imidazole as well as their homologues, and quaternary ammonium compounds. Also, tertiary phosphines such as triphenylphosphine and quaternary phosphonium compounds such as triphenylmethylphosphonium bromide are efficient catalysts. Further suitable cure accelerators include e.g. radical type catalysts such as peroxides, hydroperoxides, and azo-compounds, e.g. azobis-iso-butyronitrile.

In one embodiment, the cure accelerator is present in the curable mixture or in the curable prepolymer in an amount ranging from 0.02 wt % to 1 wt %, preferably from 0.06 wt % to 0.09 wt % based on the total weight of the curable mixture.

In one aspect, the invention relates to a crosslinked polymer obtainable by a method as defined above.

The conversion may take place with simultaneous shaping under pressure to obtain mouldings, laminates, adhesive bonds, and foams.

For these applications, it is possible to admix the curable mixture with additives such as fillers, pigments, colorants, and flame retardants. Suitable fillers are glass- or carbon fibers, graphite, quartz, metal powders, and metal oxides. Mould release agents such as silicone oil, waxes, Zn and K-stearates may also be added.

Thus, in one aspect, the present invention relates to a crosslinked polymer obtainable by a method described above.

In another aspect, the present invention relates to mouldings, laminates, adhesive bonds, and foams obtainable by processing of the curable mixture and curable prepolymers of the invention.

Composite Materials and Methods for the Preparation of Composite Materials of the Invention It has now been found that curable mixtures and prepolymers of the invention are useful for the preparation of composite materials.

In one aspect, the invention relates to a method for the preparation of a composite material comprising the steps of: applying or blending a curable mixture in form of a low-viscosity-melt stable resin obtainable according to the method as defined above, or a prepolymer as defined above, onto or with a fibrous or particulate reinforcement (filler); and subsequent curing.

In one embodiment, the curable mixture or the prepolymer as defined above is applied onto or blended with a fibrous or particulate reinforcement (filler) with the use of standard processing techniques, e.g with the use of the hot melt or solution-based prepregging, resin transfer moulding (RTM), resin infusion moulding (RIM), filament winding (FW) or compounding techniques.

Curing may be carried out at temperatures ranging from 70° C. to 280° C., preferably at temperatures ranging from 80° C. to 270° C., more preferably to at temperatures ranging from 90° C. to 260° C., most preferably at temperatures ranging from 100° C. to 250° C. for a time sufficient to complete cure.

In one aspect, the invention relates to a composite material obtainable according to the method as defined above.

In one embodiment, the composite material is a fiber-reinforced composite.

In one embodiment, the composite material is a particulate-filled composite.

In one aspect, the present invention relates to a method for the preparation of a composite material comprising the steps of:
(a) preparing a curable mixture or a prepolymer thereof as defined above,
(b) applying a curable mixture or a prepolymer thereof as defined above onto a fibrous reinforcement or blending with a particulate filler,
(c) curing the curable mixture or prepolymer thereof as defined above at a temperature ranging from 70° C. to 280° C. for a time sufficient to complete cure, and
(d) simultaneously applying pressure to obtain the composite material.

Process step c) may be carried out at temperatures ranging from 70° C. to 280° C., preferably at temperatures ranging from 80° C. to 270° C., more preferably to at temperatures ranging from 90° C. to 260° C., most preferably at temperatures ranging from 100° C. to 250° C. for a time sufficient to complete cure.

In the practice of process step c) the conversion of the curable mixtures or prepolymers of the invention into the crosslinked (cured) polymer may be carried out, in the presence of a curing catalyst as defined above.

In the practice of process step d) shaping under pressure is performed to obtain the composites of the invention. Process steps c) and d) are carried out simultaneously.

A preferred application of the curable mixtures of the invention is resins for fiber-reinforced composites. In order to obtain such fiber composites the curable mixtures of the invention are processed as hot melts to resin film on a carrier foil, which is subsequently used to prepare prepolymers by pressing fibers in the form of rovings or fabrics into the resin film. For this process curable mixtures, which have a low viscosity at low temperature are advantageous in order to provide adequate impregnation of fiber rowings or fabric.

In another aspect, the present invention relates to a fiber-reinforced composite obtainable by a method described above.

Further Applications of the Curable Mixtures of the Invention

It has been surprisingly found that curable mixtures of the invention comprising a compound of formula (I) and alkenylphenols or alkenylphenol ethers, if necessary in the presence of a reactive diluent such as the diallyl ether of bisphenol A, have a low viscosity and are very suitable for the preparation of hot melt resin films. A further advantage is that no crystallisation of the curable mixtures of the invention occurs upon storage.

In another aspect, the present invention relates to a hot-melt resin obtainable from a curable mixture of the present invention.

Further, it has been found that due to their advantageous processing properties such as low viscosity and crystallisation stability at the processing temperature the curable mixtures of the invention are suitable for fabrication of fiber-reinforced composites by use of the resin transfer moulding (RTM) process.

Thus, in one aspect, the present invention relates to a fiber-reinforced composite obtainable from a curable mixture of the invention.

It has been found that curable mixtures comprising from between 20 wt % to 60 wt % of the compound of formula (I) have a very low viscosity at temperatures ranging from 70° C. to 100° C. without crystallization. A further advantage of such curable mixtures of the present invention is the stability of their viscosity at the processing temperatures, which allows economic fabrication of complex and large components.

While the invention has been described in detail, modifications within the spirit and scope of the invention will be readily apparent to those of skill in the art. In view of the foregoing discussion, relevant knowledge in the art and disclosures discussed above in connection with the Background and Detailed Description are all incorporated herein by reference. In addition, it should be understood that aspects of the invention and portions of various embodiments and various features recited below and/or in the appended items may be combined or interchanged either in whole or in part. In the foregoing descriptions of the various embodiments, those embodiments, which refer to another embodiment, may be appropriately combined with other embodiments as will be appreciated by one of skill in the art. Furthermore, those of ordinary skill in the art will appreciate that the foregoing description is by way of example only, and is not intended to limit the invention.

EXAMPLES

The following Examples are merely specific embodiments of the present invention and are intended to illustrate but not to limit the invention.

1. General Processes for the Preparation of Curable Mixtures of the Invention

The curable mixture of the invention can be obtained according to the following general processes:

1.1 Process a) (Melt Process)—Preparation of a Curable Mixture

The maleimide of formula (I), i.e. m-xylylene bismaleimide (MXBI), at least one polyimide component, and at least one comonomer component are melt blended at a temperature from 120-140° C. until a clear melt is obtained. Subsequently, the so obtained melt is heated to 145° C. for another 30-45 minutes. Finally, the melt is degassed under vacuum at 20 hPa [15 mm Hg] for 5-10 minutes to obtain a curable mixture.

1.2 Process b) (Solution Process)—Preparation of a Curable Mixture

The maleimide of formula (I), i.e. m-xylylene bismaleimide (MXBI), the at least one polyimide component, the at least one comonomer component and toluene in a weight ratio solid-to-solvent of 1:1 are heated to 90-100° C. until a clear melt is obtained. Subsequently, toluene is stripped off under reduced pressure, and the temperature is simultaneously increased to 120° C. Finally, the mixture is degassed for 30 minutes under vacuum at 20 hPa [15 mm Hg] to obtain a curable mixture. The resin/solvent ratio may vary, depending on the solubility of components.

2. General Process for the Preparation of Cured Plates from the Curable Mixtures for Mechanical Testing—Process c)

The curable mixtures of the invention, which have been obtained, e.g. according to the processes a) or b) described above, can be processed to cured plates for mechanical testing as described below.

The curable mixtures as prepared according to processes a) or b) are cast into a preheated parallel-epipedic mould and then cured for 2 hours at 170° C., and another 4 hours at 200° C. After demoulding, the plates are postcured for 2 hours at 220° C., and another 4 hours at 250° C. to obtain cured plates. Flexural and compact tension specimens were cut from the chilled cured plates using a diamond saw.

3. Solubility Testing of the Curable Mixture—Process d)

The solubility of the curable mixture, which has been obtained, e.g. according to the processes a) or b) described above, can be tested according to the procedure described below.

50 wt % of the curable mixture of the invention, which has been obtained, e.g. according to the processes a) or b) described above, and 50 wt % of solvent are blended in a reaction flask by use of a rotary evaporator at a temperature of 50-80° C. until a clear resin solution is obtained. The resin solution is stored dark in a closed glass flask at room temperature. The solution is visually inspected over time for precipitation or crystallization.

4. Other Properties 4.0 Viscosity

The following examples demonstrate the advantages of curable mixtures (blends) based on binary eutectic mixtures of m-xylylene bismaleimide (MXBI) and one polyimide selected from either 4,4'-bismaleimidodiphenylmethane (MDAB) or bis(3-ethyl-5-methyl-4-maleimidophenyl)methane (ME-MDAB) with one co-monomer selected from either 3,3'-diallylbisphenol A or 4,4'-bis(o-propenylphenoxy)benzophenone, according to the invention, versus curable mixtures (blends) based on binary eutectic mixtures of 2,4-bismaleimidotoluene (TDAB) and one polyimide selected from either 4,4'-bismaleimidodiphenylmethane (MDAB) or bis(3-ethyl-5-methyl-4-maleimidophenyl)methane (ME-MDAB) with one co-monomer selected from either 3,3'-diallylbisphenol A or 4,4'-bis(o-propenylphenoxy)benzophenone, as used in EP 0469684A1 (examples 5-11 therefrom).

Unless mentioned otherwise samples were prepared according to process b).

Unless mentioned otherwise the molar ratio of the eutectic bismaleimide/polyimide mixtures to a co-monomer was 1.0:0.9 mol/mol, respectively.

Examples 4.0.1, 4.0.2, 4.0.3, and 4.0.4 represent curable mixtures according to the invention. Comparative data represent curable mixtures as used in or in scope of EP 0469684A1.

Example 4.0.1 represents a curable mixture (blend) based on the eutectic mixture of 34.6 parts of MXBI with 18.6 parts of MDAB and 46.7 parts of 3,3'-diallylbisphenol A, a mixture according to the present invention. The mixture was prepared according to the process b). The viscosity values at various temperatures are given in Table 2.

Comparative Example 1 represents a curable mixture (blend) based on the eutectic mixture of 16.3 parts of TDAB with 38.1 parts of MDAB and 45.6 parts of 3,3'-diallylbisphenol A, a mixture as used in EP 0469684A1. The mixture was prepared according to the process b). The viscosity values at various temperatures are given in Table 2.

TABLE 2

| Examples | Viscosity of curable mixture (mPa · s) at | | | | | | |
|---|---|---|---|---|---|---|---|
| | 70° C. | 80° C. | 90° C. | 100° C. | 110° C. | 120° C. | 130° C. |
| Example 4.0.1 | 956 | 412 | 196 | 105 | 63 | 41 | 28 |
| Comparative example 1 | 6230 | 1935 | 692 | 301 | 152 | 87 | 56 |

Example 4.0.2 represents a curable mixture (blend) based on the eutectic mixture of 34 parts of MXBI with 21 parts of ME-MDAB and 45 parts of 3,3'-diallylbisphenol A, a mixture according to the present invention. The mixture was prepared according to the process b). The viscosity values at various temperatures are given in Table 3.

Comparative Example 2 represents a curable mixture (blend) based on the eutectic mixture of 17.3 parts of TDAB with 40.4 parts of ME-MDAB and 42.3 parts of 3,3'-diallylbisphenol A, a mixture in scope of EP 0469684A1. The mixture was prepared according to the process b). The viscosity values at various temperatures are given in Table 3.

TABLE 3

| Examples | Viscosity of curable mixture (mPa · s) at | | | | | | |
|---|---|---|---|---|---|---|---|
| | 70° C. | 80° C. | 90° C. | 100° C. | 110° C. | 120° C. | 130° C. |
| Example 4.0.2 | 1606 | 680 | 309 | 160 | 92 | 57 | 38 |
| Comparative example 2 | 8830 | 2873 | 1024 | 437 | 218 | 124 | 76 |

Example 4.0.3 represents a curable mixture (blend) based on the eutectic mixture of 28.6 parts of MXBI with 15.4 parts of MDAB and 56 parts of 4,4'-bis(o-propenylphenoxy)benzophenone, a mixture according to the present invention. The mixture was prepared according to the process b). The viscosity values at various temperatures are given in Table 4.

Comparative Example 3 represents a curable mixture (blend) based on the eutectic mixture of 13.6 parts of TDAB with 31.7 parts of MDAB and 54.8 parts of 4,4'-bis(o-propenylphenoxy)benzophenone, a mixture as used in EP 0469684A1. The mixture was prepared according to the process b). The viscosity values at various temperatures are given in Table 4.

TABLE 4

| Examples | Viscosity of curable mixture (mPa · s) at | | | | | | |
|---|---|---|---|---|---|---|---|
| | 70° C. | 80° C. | 90° C. | 100° C. | 110° C. | 120° C. | 130° C. |
| Example 4.0.3 | 28530 | 8479 | 3105 | 1598 | —* | — | — |
| Comparative example 3 | 105110 | 22700 | 6717 | 3144 | —* | — | — |

*Onset of polymerization.

Example 4.0.4
represents a curable mixture (blend) based on the eutectic mixture of 28.3 parts of MXBI with 17.5 parts of ME-MDAB and 54.2 parts of 4,4'-bis(o-propenylphenoxy)benzophenone, a mixture according to the present invention. The mixture was prepared according to the process b). The viscosity values at various temperatures are given in Table 5.

Comparative Example 4 represents a curable mixture (blend) based on the eutectic mixture of 14.6 parts of TDAB with 33.9 parts of ME-MDAB and 51.5 parts of 4,4'-bis(o-propenylphenoxy)benzophenone, a mixture in scope of EP 0469684A1. The mixture was prepared according to the process b). The viscosity values at various temperatures are given in Table 5.

TABLE 5

| | Viscosity of curable mixture (mPa · s) at | | | | | | |
|---|---|---|---|---|---|---|---|
| Examples | 70° C. | 80° C. | 90° C. | 100° C. | 110° C. | 120° C. | 130° C. |
| Example 4.0.4 | 67400 | 19110 | 6097 | 2395 | 1406 | —* | — |
| Comparative example 4 | 1603000 | 145500 | 20800 | 8254 | 3123 | 1469 | —* |

*Onset of polymerization.

4.1 Curable Mixture 1b) (Process b)/Cured Plates 1c) (Process c)
Process b)
  48 parts (48 wt %) of 4,4'-bismaleimidodiphenylmethane (MDAB), 12 parts (12 wt %) of m-xylylene bismaleimide (MXBI) and 40 parts (40 wt %) of 3,3'-diallylbisphenol A are blended in solution according to process b) described above in Examples, Section 1.2.
Properties of the Curable Mixture 1b) Prepared According to Process b):
Hot plate gel time at 170° C.: 13 min
Viscosity at 80° C.: 1920 mPa·s
Viscosity at 100° C.: 257 mPa·s
Viscosity at 110° C. after 4 hours at 110° C.: 232 mPa·s
Properties of Cured Plates 1c) Prepared from Curable Mixture 1b) by Process c):
Tg: 265° C., further postcure at 250-270° C. shifts the Tg up to >300° C.
Flexural modulus: 4.37 Gpa/at 23° C.,
Flexural strength: 164 Mpa/at 23° C.
Fracture toughness: 0.7 KN/m$^{3/2}$
4.2 Curable Mixtures 2a)/b) (Processes a) and b)/Cured Plates 2c) (Process c)
Process a)
  12 parts (12 wt %) of 4,4'-bismaleimidodiphenylmethane (MDAB), 48 parts (48 wt %) of m-xylylene bismaleimide (MXBI) and 40 parts (40 wt %) of 3,3'-diallylbisphenol A are melt blended according to process a) described above in Examples, Section 1.1.
Properties of the Curable Mixture 2a) Prepared According to Process a):
Hot plate gel time at 170° C.: 18 min
Viscosity at 80° C.: 749 mPa·s
Viscosity at 90° C.: 280 mPa·s
Viscosity at 90° C. after 4 hours at 90° C.: 345 mPa·s
Viscosity at 100° C.: 166 mPa·s Process b)
  12 parts (12 wt %) of 4,4'-bismaleimidodiphenylmethane (MDAB), 48 parts (48 wt %) of m-xylylene bismaleimide (MXBI) and 40 parts (40 wt %) of 3,3'-diallylbisphenol A are blended in solution according to process b) described above in Examples, Section 1.2.
Properties of the Curable Mixture 2b) Prepared According to Process b):
Hot plate gel time at 170° C.: 26 min
Viscosity at 80° C.: 446 mPa·s
Viscosity at 100° C.: 117 mPa·s
Viscosity at 100° C. after 2 hours at 100° C.: 94 mPa·s
Properties of Cured Plates 2c) Prepared from Curable Mixture 2b) by Process c)
Tg: 260° C., further postcure at 250-270° C. shifts the Tg up to >300° C.
Flexural modulus: 4.72 Gpa/at 23° C.,
Flexural strength: 162 Mpa/at 23° C.

Fracture toughness: 0.7 KN/m$^{3/2}$
4.3 Curable Mixtures 3 a)/b) (Processes a) and b)/Cured Plates 3c) (Process c)
Process a)
  30 parts (30 wt %) of 4,4'-bismaleimidodiphenylmethane (MDAB), 30 parts (30 wt %) of m-xylylene bismaleimide (MXBI), 30 parts (30 wt %) of 3,3'-diallylbisphenol A, and 10 parts (10 wt %) of diallyl ether of bisphenol A are melt blended according to process a) described above in Examples, Section 1.1.
Properties of the Curable Mixture 3a) Prepared According to Process a):
Hot plate gel time at 170° C.: 27 min
Viscosity at 80° C.: 1250 mPa·s
Viscosity at 100° C.: 220 mPa·s
Process b)
  30 parts (30 wt %) of 4,4'-bismaleimidodiphenylmethane (MDAB), 30 parts (30 wt %) of m-xylylene bismaleimide (MXBI), 30 parts (30 wt %) of 3,3'-diallylbisphenol A, and 10 parts (10 wt %) of diallyl ether of bisphenol A are blended in solution according to process b) described above in Examples, Section 1.2.
Properties of the Curable Mixture 3b) Prepared According to Process b):
Hot plate gel time at 170° C.: 30 min
Viscosity at 80° C.: 470 mPa·s
Viscosity at 100° C.: 114 mPa·s
Viscosity at 100° C. after 2 hours at 100° C.: 109 mPa·s
Properties of Cured Plates 3c) Prepared from Curable Mixture 3b) by Process c):
Tg: 260° C., further postcure at 250-270° C. shifts the Tg up to >300° C.
Flexural modulus: 4.42 Gpa/at 23° C.,
Flexural strength: 169 Mpa/at 23° C.

4.4 Curable Mixtures 4b) (Process b)/Cured Plates 4c) (Process c)

Process b)

30 parts (30 wt %) of 4,4'-bismaleimidodiphenylmethane (MDAB), 18 parts (18 wt %) of m-xylylene bismaleimide, 12 parts (12 wt %) of 2,2,4-trimethylhexamethylenebismaleimide are blended in solution according to process b) described above in Examples, Section 1.2.

Finally, 40 parts (30 wt %) of 3,3'-diallylbisphenol A, preheated to 100° C. are added and the mixture is heated for 10 minutes at 100-120° C. to obtain a clear melt.

Properties of the Curable Mixture 4b) Prepared According to Process b)

Hot plate gel time at 170° C.: 20 min
Viscosity at 80° C.: 790 mPa·s
Viscosity at 100° C.: 173 mPa·s
Viscosity at 110° C. after 4 hours at 110° C.: 99 mPa·s Properties of Cured Plates 4c) Prepared from Curable Mixture 4b) by Process c)

Tg: 250° C., further postcure at 250-270° C. shifts the Tg up to >300° C.
Flexural modulus: 4.32 Gpa/at 23° C.,
Flexural strength: 156 Mpa/at 23° C.

4.5 Curable Mixture 5b) (Process b)

Process b)

30 parts (29.7 wt %) of 4,4'-bismaleimidodiphenylmethane (MDAB), 18 parts (17.8 wt %) of m-xylylene bismaleimide, 12 parts (11.9 wt %) of 2,2,4-trimethylhexamethylenebismaleimide, and 1.0 parts (1.0 wt %) of phenothiazine are blended in solution according to process b) described above in Examples, Section 1.2. Finally, 40 parts (39.6 wt %) of 3,3'-diallylbisphenol A, preheated to 100° C. are added and the mixture is heated for 10 minutes at 100-120° C. to obtain a clear melt.

Properties of the Curable Mixture 5b Prepared According to Process b)

Hot plate gel time at 170° C.: 11 min
Viscosity at 80° C.: 710 mPa·s
Viscosity at 100° C.: 158 mPa·s
Viscosity at 100° C. after 4 hours at 100° C.: 156 mPa·s 4.6 Curable Mixtures 6a)/b) (Processes a) and b)

Process a)

30 parts (30 wt %) of bis(3-methyl-5-ethyl-4-maleimidophenyl)methane, 30 parts (30 wt %) of m-xylylene bismaleimide (MXBI), 40 parts (40 wt %) of diallyl ether of bisphenol A are melt blended according to process a) described above in Examples, Section 1.1.

Properties of the Curable Mixture 6a) Prepared According to Process a):

Hot plate gel time at 170° C.: 37 min
Viscosity at 80° C.: 2035 mPa·s
Viscosity at 100° C.: 421 mPa·s
Solution stability: stable solution for >9 weeks at 50 wt % in 1,3 dioxolane with no crystallisation Process b)

30 parts (30 wt %) of bis(3-methyl-5-ethyl-4-maleimidophenyl)methane, 30 parts (30 wt %) of m-xylylene bismaleimide (MXBI), 40 parts (40 wt %) of diallyl ether of bisphenol A are blended in solution according to process b) described above in Examples, Section 1.2.

Properties of the Curable Mixture 6b) Prepared According to Process b):

Hot plate gel time at 170° C.: 37 min
Viscosity at 80° C.: 154 mPa·s
Viscosity at 90° C. after 4 hours at 90° C.: 81 mPa·s
Viscosity at 100° C.: 56 mPa·s 4.7 Curable Mixtures 7 a)/b) (Processes a) and b)/Cured Plates 7c) (Process c)

Process a)

30 parts (30 wt %) of bis(3-methyl-5-ethyl-4-maleimidophenyl)methane, 30 parts (30 wt %) of m-xylylene bismaleimide (MXBI), 40 parts (40 wt %) of 3,3'-diallylbisphenol A are melt blended according to process a) described above in Examples, Section 1.1.

Properties of the Curable Mixture 7a) Prepared According to Process a):

Hot plate gel time at 170° C.: 47 min
Viscosity at 80° C.: 2400 mPa·s
Viscosity at 100° C.: 281 mPa·s
Solution stability: stable solution for >9 weeks at 50 wt % in 1,3 dioxolane with no crystallization Process b)

30 parts (30 wt %) of bis(3-methyl-5-ethyl-4-maleimidophenyl)methane, 30 parts (30 wt %) of m-xylylene bismaleimide (MXBI), 40 parts (40 wt %) of 3,3'-diallylbisphenol A are blended blended in solution according to process b) described above in Examples, Section 1.2.

Properties of the Curable Mixture 7b) Prepared According to Process b):

Hot plate gel time at 170° C.: 38 min
Viscosity at 80° C.: 705 mPa·s
Viscosity at 100° C.: 164 mPa·s
Viscosity at 110° C. after 4 hours at 110° C.: 99 mPa·s Properties of Cured Plates 7c) Prepared from Curable Mixture 7b) by Process c):

Tg: 251° C., further postcure at 250-270° C. shifts the Tg up to >300° C.
Flexural modulus: 4.25 Gpa/at 23° C.,
Flexural strength: 156 Mpa/at 23° C.

4.8 Curable Mixture 8b) (Process b)/Cured Plates 8c) (Process c)

Process b)

30 parts (29.94 wt %) of bis-(3-methyl, 5-ethyl, 4-maleimidophenyl)methane, 30 parts (29.94 wt %) of m-xylylene bismaleimide (MXBI), 40 parts (39.92 wt %) of 3,3'-diallylbisphenol A and 0.2 parts (0.2 wt %) of triphenylphosphine are blended in solution according to process b) described above in Examples, Section 1.2.

Properties of the Curable Mixture 8b) Prepared According to Process b):

Hot plate gel time at 170° C.: 30 min
Viscosity at 80° C.: 750 mPa·s
Viscosity at 100° C.: 182 mPa·s
Viscosity at 100° C. after 4 hours at 100° C.: 260 mPa·s Properties of Cured Plates 8c) Prepared from Curable Mixture 8b) by Process c):

Tg: 225° C., further postcure at 250-270° C. shifts the Tg up to >300° C.
Flexural modulus: 3.99 Gpa/at 23° C.,
Flexural strength: 134 MPa/at 23° C.

4.9 Curable Mixture 9b) (Process b)

Process b)

25 parts (25 wt %) of 4,4'-bismaleimidodiphenylmethane (MDAB), 25 parts (25 wt %) of m-xylylene bismaleimide (MXBI) and 50 parts (50 wt %) bisphenol A dicyanate are blended in solution according to process b) described above in Examples, Section 1.2.

Properties of the Curable Mixture 9b) Prepared According to Process b):

Hot plate gel time at 170° C.: 53 min
Viscosity at 80° C.: 1350 mPa·s
Viscosity at 100° C.: 270 mPa·s
Viscosity at 90° C. after 4 hours at 90° C.: 525 mPa·s 4.10 Curable Mixture 10b) (Process b)/Cured Plates 10c) (Process c)

Process b)

25 parts (25 wt %) of 4,4'-bismaleimidodiphenylmethane (MDAB), 25 parts (25 wt %) of m-xylene bismaleimide (MXBI) and 45 parts (45 wt %) bisphenol A dicyanate, 5 parts (5 wt %) 3,3'-diallylbisphenol A are blended in solution according to process b) described above in Examples, Section 1.2.

Properties of the Curable Mixture 10b) Prepared According to Process b):

Hot plate gel time at 170° C.: 33 min
Viscosity at 80° C.: 1120 mPa·s
Viscosity at 100° C.: 235 mPa·s
Viscosity at 110° C. after 4 hours at 110° C.: 144 mPa·s Properties of Cured Plates 10c) Prepared from Curable Mixture 10b) by Process c):

Tg: 235° C., further postcure at 250-270° C. shifts the Tg up to >300° C.
Flexural modulus: 4.53 Gpa/at 23° C.,
Flexural strength: 111 MPa/at 23° C.
Fracture toughness: 0.48 KN/m$^3$/$^2$
Solution stability: stable solution for >9 weeks at 55 wt % in 1.3 dioxolane with no crystallization 4.11 Curable Mixture 11b) (Process b)/Cured Plates 11c) (Process c)

Process b)

6 parts (6 wt %) of m-aminobenzhydrazide are blended with 50 ml of 1-methoxypropanol-2 and heated to 60° C. to obtain a solution. 5 parts (5 wt %) of 4,4'-bismaleimidodiphenylmethane (MDAB), 65 parts (65 wt %) of m-xylene bismaleimide (MXBI), and 50 ml of toluene are added to the solution and the mixture is heated to 120° C. until a homogenous solution is obtained. The solution is maintained for additional 20 minutes at 120° C. Then solvent is stripped off and 24 parts (24 wt %) of 3,3'-diallylbisphenol A (preheated to 80° C.) are added to the remaining residue, and the resulting homogenous melt is degassed under vacuum for 5 minutes at 130° C.

Properties of the Curable Mixture 11 b) Prepared According to Process b)

Hot plate gel time at 170° C.: 31 min
Viscosity at 80° C.: 179 mPa·s
Viscosity at 80° C. after 4 hours at 80° C.: 109 mPa·s
Viscosity at 100° C.: 60 mPa·s Properties of Cured Plates 11c) Prepared from Curable Mixture 11b) by Process c):

Tg: 245° C., further postcure at 250-270° C. shifts the Tg up to >300° C.
Flexural modulus: 5.44 Gpa/at 23° C.,
Flexural strength: 133 MPa/23° C.

Preparation of a 60 wt % Solution of the Curable Mixture 11 b):

To 100 g of the hot melt are added 67 g of 1,3-dioxolane to obtain a homogenous 60 wt % solution.

The resin solution shows the following properties.

Hot plate gel time at 170° C.: 30 min
Solution viscosity at 25° C.: 55±5 cP.

4.12 Curable Mixture 12b) (Process b)

Process b)

45 parts (45 wt %) of 4,4'-bismaleimidodiphenylmethane (MDAB), 20 parts (20 wt %) of m-xylene bismaleimide (MXBI), 25 parts (25 wt %) of 3,3'-diallylbisphenol A and 10 parts (10 wt %) of bis(o-propenylphenoxy)benzophenone (BOAP) are blended in solution according to process b) described above in Examples, Section 1.2.

Properties of the Curable Mixture 12b) Prepared According to Process b):

Hot plate gel time at 170° C.: 15 min
Viscosity at 80° C.: 4990 mPa·s
Viscosity at 100° C.: 700 mPa·s
Viscosity at 120° C. after 4 hours at 120° C.: 574 mPa·s 4.13 Curable Mixture 13b) (Process b)/Cured Plates 13c) (Process c)

Process b)

20 parts (19.87 wt %) of 4,4'-bismaleimidodiphenylmethane (MDAB), 40 parts (39.74 wt %) of m-xylene bismaleimide (MXBI), 30 parts (29.80 wt %) of 3,3'-diallylbisphenol A, 10 parts (9.34 wt %) of bis(o-propenylphenoxy)benzophenone and 0.66 parts (0.66 wt %) of phenothiazine are blended in solution according to process b) described above in Examples, Section 1.2.

Properties of the Curable Mixture 13b) Prepared According to Process b):

Hot plate gel time at 170° C.: 5 min
Viscosity at 80° C.: 1120 mPa·s
Viscosity at 90° C. after 4 hours at 90° C.: 686 mPa·s
Viscosity at 100° C.: 220 mPa·s Properties of Cured Plates 13c) Prepared from Curable Mixture 13b) by Process c):

Tg: 310° C.
Flexural modulus: 4.80 Gpa/at 23° C.,
Flexural strength: 146 MPa/at 23° C.
Fracture toughness: 0.53 KN/m$^3$/$^2$ 4.14 Curable Mixture 14b) (Process b)/Cured Plates 14c) (Process c)

Process b)

35 parts (35 wt %) of bis(3-methyl-5-ethyl-4-maleimidophenyl)methane, 30 parts (30 wt %) of m-xylene bismaleimide (MXBI), 25 parts (25 wt %) of 3,3'-diallylbisphenol A, and 10 parts (10 wt %) of bis(o-propenylphenoxy)benzophenone are blended in solution according to process b) described above in Examples, Section 1.2.

Properties of the Curable Mixture 14b) Prepared According to Process b):

Hot plate gel time at 170° C.: 40 min
Viscosity at 80° C.: 3230 mPa·s
Viscosity at 100° C.: 508 mPa·s
Viscosity at 90° C. after 4 hours at 90° C.: 1003 mPa·s
Viscosity at 120° C. after 4 hours at 120° C.: 121 mPa·s Properties of Cured Plates 14c) Prepared from Curable Mixture 14b) by Process c):

Tg: 290° C.
Flexural modulus: 3.99 Gpa/at 23° C.,
Flexural strength: 116 MPa/at 23° C.

4.15 Curable Mixture 15a) (Process a)

Process a)

30 parts (30 wt %) of bis(3-methyl-5-ethyl-4-maleimidophenyl)methane, 30 parts (30 wt %) of m-xylene bismaleimide (MXBI), 30 parts (30 wt %) of 3,3'-diallylbisphenol A and 10 parts (10 wt %) of diallyl ether of bisphenol A are melt blended according to process a) described above in Examples, Section 1.1.

Properties of the Curable Mixture 15a) Prepared According to Process b):

Hot plate gel time at 170° C.: 35 min
Viscosity at 80° C.: 2035 mPa·s
Viscosity at 100° C.: 421 mPa·s Preparation of a 55 wt % Solution of the Curable Mixture 15a):

A 55 wt % solution 1,3-dioxolane of the curable mixture 15a) is prepared according to process d). The solution is stable at room temperature with a slight viscosity increase but no crystallization for >6 months.

4.16 Curable Mixture 16b) (Process b)/Cured Plates 16c) (Process c)

Process b)

30 parts (30 wt %) of bis-(3-methyl, 5-ethyl, 4-maleimidophenyl)methane, 30 parts (30 wt %) of m-xylene bis-maleimide (MXBI), and 40 parts of bis(o-propenylphenoxy)benzophenone (BOAP) are blended in solution according to process b) described above in Examples, Section 1.2.

Preparation of a 55 wt % Solution of the Curable Mixture 16b):

A 55 wt % solution of the curable mixture 16b) in 1,3-dioxolane is prepared according to procedure d). The solution is stable at room temperature with a slight viscosity increase but no crystallization for >6 months.

The invention claimed is:

1. A curable mixture comprising:
RM % of m-xylylene bismaleimide of formula (I)

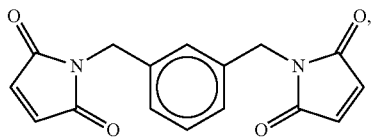

RP % of a polyimide component, and
RC % of a comonomer component,
wherein
the polyimide component consists of at least one polyimide of formula (II)

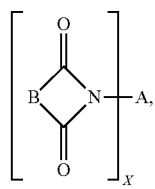

wherein
A is an X-functional group with at least two carbon atoms,
X is an integer >2, and
B is selected from

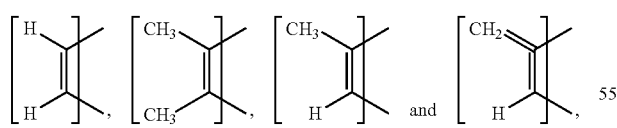

with the proviso that when B is

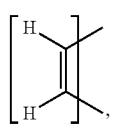

A cannot be

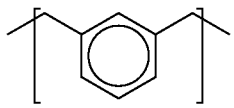

and X cannot be 2;
wherein the comonomer component consists of at least one comonomer selected from the group consisting of alkenylphenol, alkenylphenyl ether, alkenylphenol ether, polyamine, aminophenol, amino acid hydrazide, cyanate ester, diallyl phthalate, triallyl isocyanurate, triallyl cyanurate, styrene, and divinylbenzene;
and wherein
RM % is defined as 1 wt % to 98 wt %;
RP % is defined as 1 wt % to 98 wt %;
RC % is defined as 1 wt % to 98 wt %;
and wherein the sum of RM %, RP % and RC % is less than or equal to 100 wt %.

2. The curable mixture of claim 1, wherein the comonomer component consists of at least one comonomer selected from the group consisting of:
(a) a compound of formula (III)

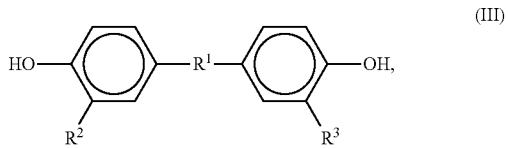

wherein
$R^1$ is a difunctional group, and
$R^2$ and $R^3$ are identical or different and each is independently from the other alkenyl with 2 to 6 carbon atoms;
(b) a compound of formula (IV)

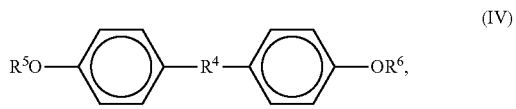

wherein
$R^4$ is a difunctional group, and
$R^5$ and $R^6$ are identical or different and each is independently from the other alkenyl with 2 to 6 carbon atoms;
(c) a compound of formula (V)

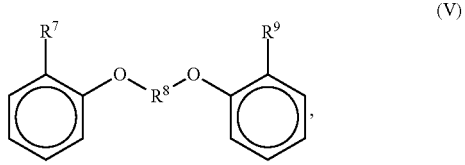

wherein
$R^8$ is a difunctional group, and
$R^7$ and $R^9$ are identical or different and each is independently from the other alkenyl with 2 to 6 carbon atoms;

(d) a compound of formula (VI)

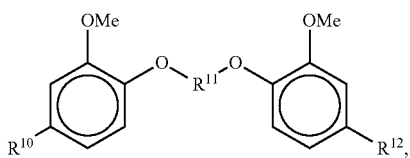

(VI)

wherein
$R^{11}$ is a difunctional group, and
$R^{10}$ and $R^{12}$ are identical or different and each is independently from the other alkenyl with 2 to 6 carbon atoms;

(e) a compound of formula (VII)

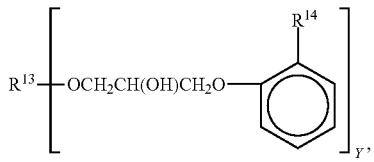

(VII)

wherein
$R^{13}$ is a Y-functional group,
$R^{14}$ is alkenyl with 2 to 6 carbon atoms, and
Y is an integer ≥1; and (f) a compound of formula (VIII)

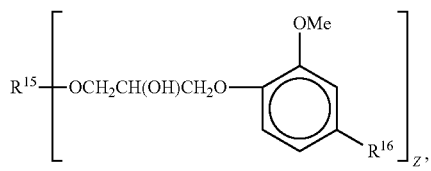

(VIII)

wherein
$R^{15}$ is a Z-functional group,
$R^{16}$ is alkenyl with 2 to 6 carbon atoms, and
Z is an integer ≥1.

3. The curable mixture of claim 2, wherein $R^1$ and $R^4$ are selected from the group consisting of:

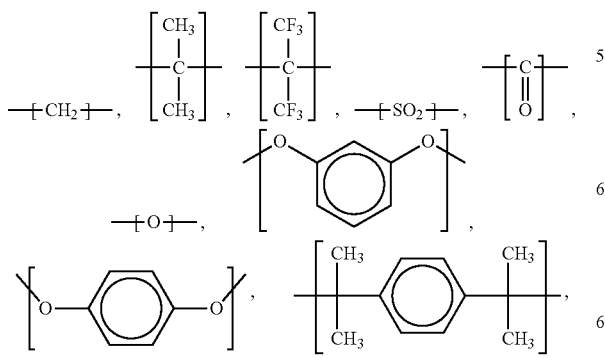

-continued

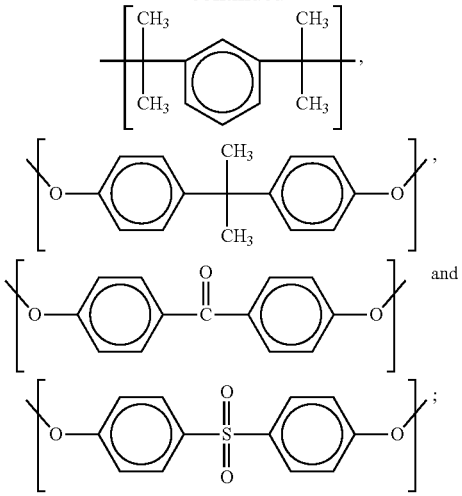

and
$R^2$, $R^3$, $R^5$ and $R^6$ are identical and are 1-propenyl or 2-propenyl;
wherein $R^8$ and $R^{11}$ are selected from the groups consisting of:

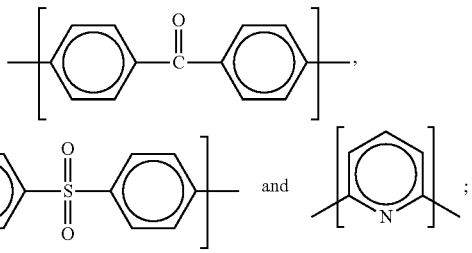

and
$R^7$, $R^9$, $R^{10}$ and $R^{12}$ are identical and are 1-propenyl or 2-propenyl;
wherein $R^{13}$ and $R^{15}$ are difunctional aromatic groups selected from the group consisting of:

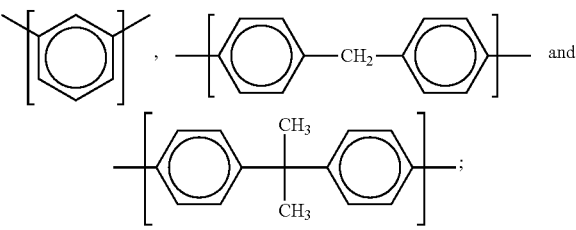

and wherein $R^{14}$ and $R^{16}$ are 1-propenyl or 2-propenyl.

4. The curable mixture of claim 1, wherein the comonomer component consists of at least one comonomer selected from the group consisting of: 3,3'-diallylbisphenol A, diallyl ether of bisphenol A, bis-(o-propenylphenoxy)benzophenone, m-minobenzhydrazide, bisphenol A dicyanate ester, diallyl phthalate, triallyl isocyanurate, triallyl cyanurate, styrene, and divinylbenzene.

5. The curable mixture of claim 1, wherein the polyimide component consists of at least one polyimide of formula (II), wherein A is a difunctional group selected from the group consisting of:

a) alkylene with 2 to 12 carbon atoms;
b) a mono- or dicarbocyclic aliphatic group;
c) a bridged multicyclic aliphatic group;
d) a heterocyclic aliphatic group;
e) a mono- or dicarbocyclic aromatic group;
f) a bridged multicyclic aromatic group;
g) a heterocyclic aromatic group;
(h) one of the following groups:

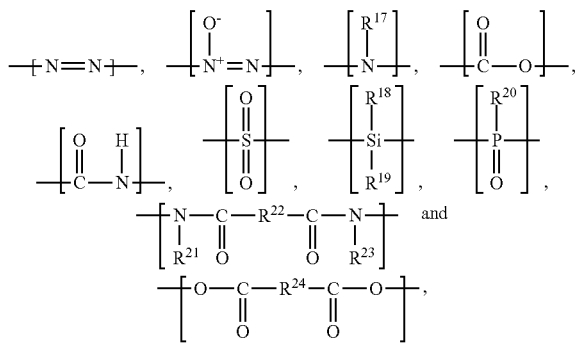

wherein $R^{17}$, $R^{18}$, $R^{19}$, $R^{20}$, $R^{21}$ and $R^{23}$ are identical or different and each is independently an alkyl with 1 to 6 carbon atoms,
and wherein $R^{22}$ and $R^{24}$ are identical or different and each is independently an alkylene with 1 to 6 carbon atoms; and
(i) a group defined by formula (IX)

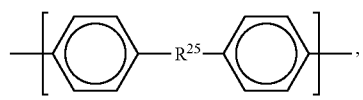

wherein $R^{25}$ is selected from the following groups:

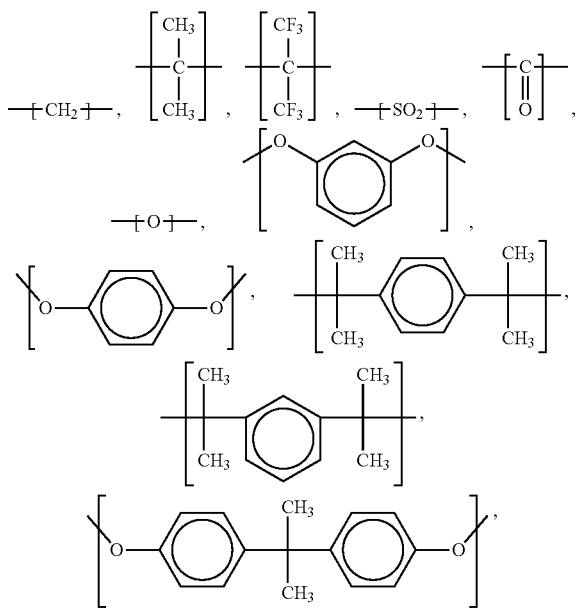

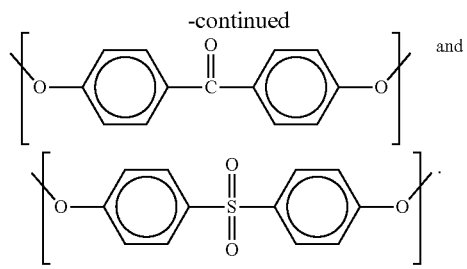

6. The curable mixture of claim 1, wherein the polyimide component consists of at least one polyimide selected from the group consisting of 4,4'-bismaleimidodiphenylmethane, bis(3-methyl-5-ethyl-4-maleimidophenyl)methane, bis(3,5-dimethyl-4-maleimidophenyl)methane, 4,4'-bismaleimidodiphenyl ether, 4,4'-bismaleimidodiphenylsulfone, 3,3'-bismaleimidodiphenylsulfone, bismaleimidodiphenylindane, 2,4-bismaleimidotoluene, 2,6-bismaleimidotoluene, 1,3-bismaleimidobenzene, 1,2-bismaleimidobenzene, 1,4-bismaleimidobenzene, 1,2-bismaleimidoethane, 1,6-bismaleimidohexane, 1,6-bismaleimido-(2,2,4-trimethyl)hexane, 1,6-bismaleimido-(2,4,4-trimethyl)hexane, 1,4-bismaleimidocyclohexane, 1,3-bis(maleimidomethyl)cyclohexane, 1,4-bis(maleimidomethyl)cyclohexane, and 4,4'-bismaleimidodicyclohexylmethane.

7. The curable mixture of claim 1, wherein
RM % is defined as 5 wt % to 70 wt %;
RP % is defined as 1 wt % to 60 wt %; and
RC % is defined as 20 wt % to 80 wt %.

8. The curable mixture of claim 1, further comprising
a cure accelerator or
a cure inhibitor.

9. A method for the preparation of a curable mixture according to claim 1, comprising the step of:
blending the comonomer component as defined in claim 1, the polyimide component as defined in claim 1 and the m-xylylene bismaleimide of formula (I) as defined in claim 1 at a temperature ranging from 60° C. to 180° C. to obtain a curable mixture as a low melting, low viscosity mass.

10. A method for the preparation of a curable mixture according to claim 1, comprising the steps of:
dissolving the comonomer component as defined in claim 1, the polyimide component as defined in claim 1 and the m-xylylene bismaleimide of formula (I) as defined in claim 1 in a solvent, and stripping off the solvent to obtain a curable mixture as a solvent-free low melting, low viscosity mass.

11. The method according to claim 10, wherein the solvent is 1,3-dioxolane or a 1,3-dioxolane-containing solvent.

12. A method for the preparation of a curable prepolymer comprising the step of:
keeping a curable mixture as defined in claim 1 at a temperature ranging from 25 ° C. to 280 ° C. for a time sufficient to obtain a curable prepolymer, wherein the curable prepolymer is still formable upon the application of heat and/or pressure.

13. The curable prepolymer obtainable according to the method of claim 12.

14. A method for the preparation of a crosslinked polymer comprising the step of:
heating the curable mixture as defined in claim 1 to a temperature ranging from 70 ° C. to 280° C. for a time sufficient to complete cure.

15. A method for the preparation of a crosslinked polymer comprising the step of:
   heating the curable prepolymer as defined in claim 13 to a temperature ranging from 70° C. to 280° C. for a time sufficient to complete cure.

16. The crosslinked polymer obtainable by the method of claim 14.

17. The crosslinked polymer obtainable by the method of claim 15.

18. A method for the preparation of a composite material comprising the steps of:
   applying or blending a curable mixture in form of the low melting, low viscosity-mass obtainable according to the method of claim 9 onto or with a fibrous or particulate reinforcement;
   and curing the curable mixture to yield a composite material.

19. A method for the preparation of a composite material comprising the steps of:
   applying or blending a curable mixture in form of the low melting, low viscosity-mass obtainable according to the method of claim 10, onto or with a fibrous or particulate reinforcement;
   and curing the curable mixture to yield a composite material.

20. A method for the preparation of a composite material comprising the steps of:
   applying or blending a curable mixture in form of the curable prepolymer according to claim 13, onto or with a fibrous or particulate reinforcement;
   and curing the curable mixture to yield a composite material.

21. The composite material obtainable according to the method of claim 18.

22. The composite material obtainable according to the method of claim 19.

23. The composite material obtainable according to the method of claim 20.

\* \* \* \* \*